US008724717B2

(12) United States Patent
Lin et al.

(10) Patent No.: US 8,724,717 B2
(45) Date of Patent: *May 13, 2014

(54) PILOT PATTERN DESIGN FOR HIGH-RANK MIMO OFDMA SYSTEMS

(75) Inventors: Chih-Yuan Lin, Wujie Township, Yilan County (TW); Pei-Kai Liao, Mingjian Xiang (TW)

(73) Assignee: Mediatek Inc. (TW)

( * ) Notice: Subject to any disclaimer, the term of this patent is extended or adjusted under 35 U.S.C. 154(b) by 884 days.

This patent is subject to a terminal disclaimer.

(21) Appl. No.: 12/384,705

(22) Filed: Apr. 8, 2009

(65) Prior Publication Data

US 2009/0257519 A1 Oct. 15, 2009

Related U.S. Application Data

(60) Provisional application No. 61/043,760, filed on Apr. 10, 2008, provisional application No. 61/049,786, filed on May 2, 2008, provisional application No. 61/075,876, filed on Jun. 26, 2008, provisional application No. 61/094,504, filed on Sep. 5, 2008, provisional application No. 61/109,546, filed on Oct. 30, 2008, provisional application No. 61/156,576, filed on Mar. 2, 2009.

(51) Int. Cl.
*H04K 1/10* (2006.01)
(52) U.S. Cl.
USPC .......................................... 375/260
(58) Field of Classification Search
USPC .......... 375/260; 714/786, 794, 795; 370/69.1, 370/323, 208, 203, 206, 310; 455/59
See application file for complete search history.

(56) References Cited

U.S. PATENT DOCUMENTS

| 7,046,978 | B2 | 5/2006 | Burke et al. ................. 455/272 |
| 7,123,191 | B2 | 10/2006 | Goldberg ..................... 342/378 |

(Continued)

FOREIGN PATENT DOCUMENTS

| TW | 1284463 | 7/2007 |
| TW | 1287366 | 9/2007 |

(Continued)

OTHER PUBLICATIONS

International Search Report and Written Opinion of International Search Authority for PCT/CN2009/071233 dated Jul. 16, 2009 (16 pages).

(Continued)

*Primary Examiner* — Shuwang Liu
*Assistant Examiner* — Helene Tayong
(74) *Attorney, Agent, or Firm* — Imperium Patent Works; Zheng Jin; Helen Mao

(57) ABSTRACT

In OFDMA wireless communications systems, pilot pattern design is optimized based on predefined resource block size. The number of pilots and the spacing between pilots within a resource block is determined based on a set of system requirements. In one novel aspect, in a high-rank MIMO system, pilots are allocated within a resource block to avoid channel extrapolation in frequency domain only. Because high-rank MIMO only supports low-mobility environment, time-domain extrapolation is no longer a dominant factor. For uplink transmission, one or more frequency tones at one or more edges of the resource block are reserved to be pilot-free to reduce multiuser synchronization error effect. When continuous resource blocks are jointly used for channel estimation, the upper and lower edges of each resource block are left with blanks such that edge pilots of adjacent resource blocks are not too close to each other to improve channel estimation.

15 Claims, 21 Drawing Sheets

(56) References Cited

U.S. PATENT DOCUMENTS

| | | |
|---|---|---|
| 7,248,559 B2 | 7/2007 | Ma et al. .................. 370/208 |
| 7,436,757 B1 | 10/2008 | Wilson et al. ............. 370/203 |
| 7,912,024 B2 | 3/2011 | Trachewsky ............... 370/338 |
| 8,111,763 B2* | 2/2012 | Ma et al. .................. 375/260 |
| 2003/0072254 A1 | 4/2003 | Ma et al. .................. 370/208 |
| 2004/0131007 A1 | 7/2004 | Smee et al. ............... 370/208 |
| 2006/0120272 A1 | 6/2006 | Wang et al. ............... 370/208 |
| 2006/0172704 A1 | 8/2006 | Nishio et al. ............. 455/67.11 |
| 2006/0209670 A1 | 9/2006 | Gorokhov et al. .......... 370/208 |
| 2006/0209732 A1 | 9/2006 | Gorokhov et al. .......... 370/310 |
| 2006/0280114 A1 | 12/2006 | Osseiran et al. ........... 370/208 |
| 2006/0280262 A1* | 12/2006 | Malladi .................... 375/299 |
| 2006/0285484 A1 | 12/2006 | Papasakellariou et al. ... 370/208 |
| 2007/0121538 A1 | 5/2007 | Ode et al. ................. 370/323 |
| 2007/0127362 A1 | 6/2007 | Bune ....................... 370/208 |
| 2007/0195688 A1 | 8/2007 | Bhushan et al. ............ 370/203 |
| 2008/0068980 A1 | 3/2008 | Lim et al. ................. 370/208 |
| 2008/0101214 A1 | 5/2008 | Jitsukawa et al. .......... 370/208 |
| 2008/0253279 A1* | 10/2008 | Ma et al. .................. 370/206 |
| 2008/0253469 A1 | 10/2008 | Ma et al. .................. 375/260 |
| 2009/0213950 A1 | 8/2009 | Gorokhov et al. .......... 375/260 |
| 2009/0257516 A1* | 10/2009 | Hsieh et al. ............... 375/260 |
| 2009/0316675 A1* | 12/2009 | Malladi et al. ............. 370/343 |
| 2010/0135423 A1* | 6/2010 | Lindoff et al. ............. 375/260 |
| 2010/0226334 A1* | 9/2010 | Ma et al. .................. 370/329 |
| 2011/0026482 A1* | 2/2011 | Li et al. ................... 370/329 |

FOREIGN PATENT DOCUMENTS

| | | | |
|---|---|---|---|
| TW | 1291292 | 12/2007 | |
| WO | WO 2007098450 A2 * | 8/2007 | .............. H04B 7/06 |
| WO | WO2007098450 A2 | 8/2007 | |

OTHER PUBLICATIONS

SIPO, the Second Examination Opinion of Chinese patent application 200980000385.9, dated Jul. 18, 2012. (9 pages).

Office Action, for related U.S. Appl. 12/384,762, dated Jul. 19, 2012(45 pages).

Office Action, for U.S. Appl. No. 12/384,762, dated on Jan. 27, 2012 (39 pages).

Office Action, for U.S. Appl. No. 12/384,754, dated on Feb. 23, 2012 (28 pages).

Taiwan IPO, Examination Opinion of Taiwan application 098111960, dated Nov. 12, 2012(7 pages).

Taiwan IPO, Examination Opinion of Taiwan application 098111964, dated Feb. 19, 2013(8 pages).

* cited by examiner

METHOD OF POSITIONING PILOTS IN AN OFDMA COMMUNICATIONS SYSTEM

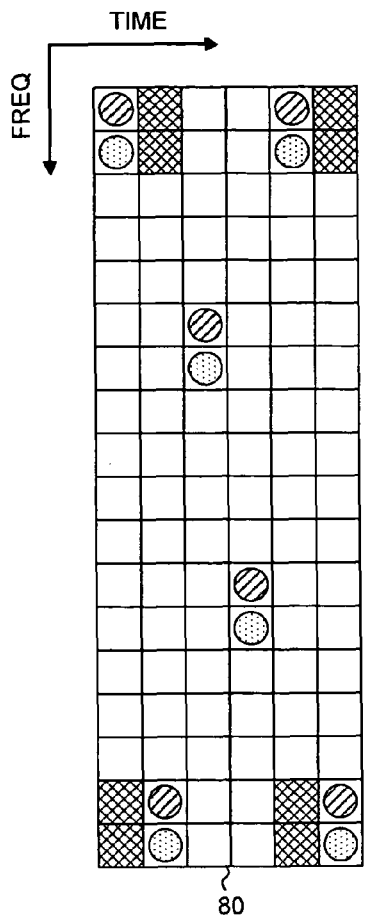
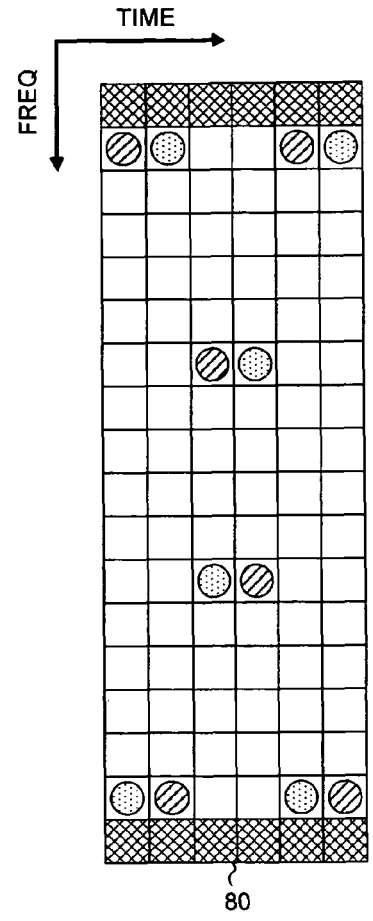
FIG. 6B
FIG. 6C

METHOD OF POSITIONING PILOTS IN AN OFDMA COMMUNICATIONS SYSTEM FOR SMALLER RESOURCE BLOCK SIZE

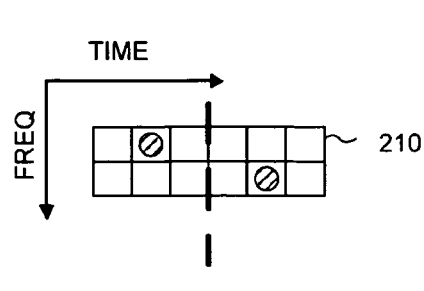
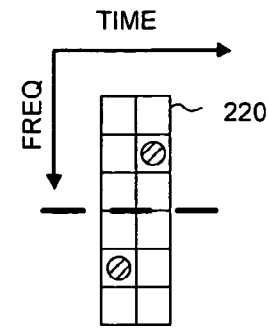
FIG. 11A              FIG. 11B
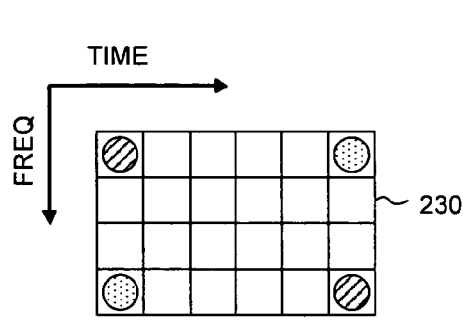
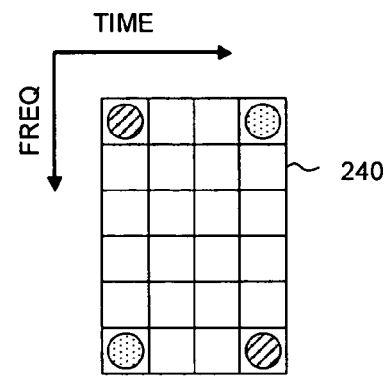
⊘  PILOT P1 FOR STREAM #1         ⊘  PILOT P1 FOR STREAM #1
●  PILOT P2 FOR STREAM #2         ●  PILOT P2 FOR STREAM #2
FIG. 12A              FIG. 12B METHOD OF POSITIONING PILOTS IN AN OFDMA COMMUNICATIONS SYSTEM FOR HIGH-RANK MIMO

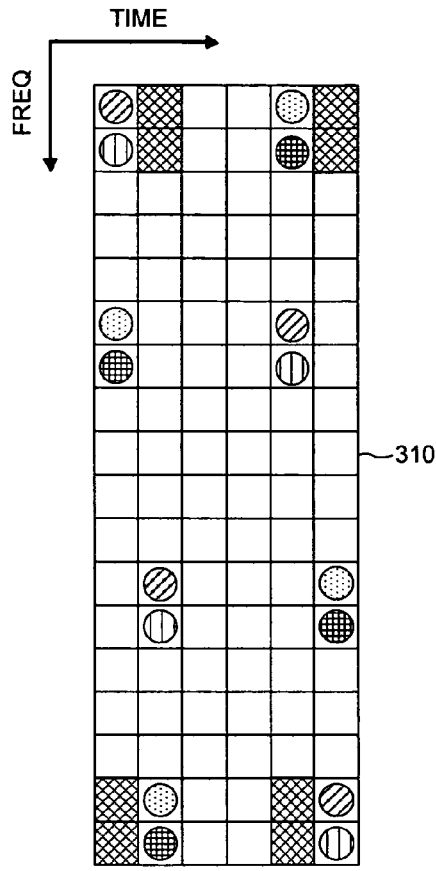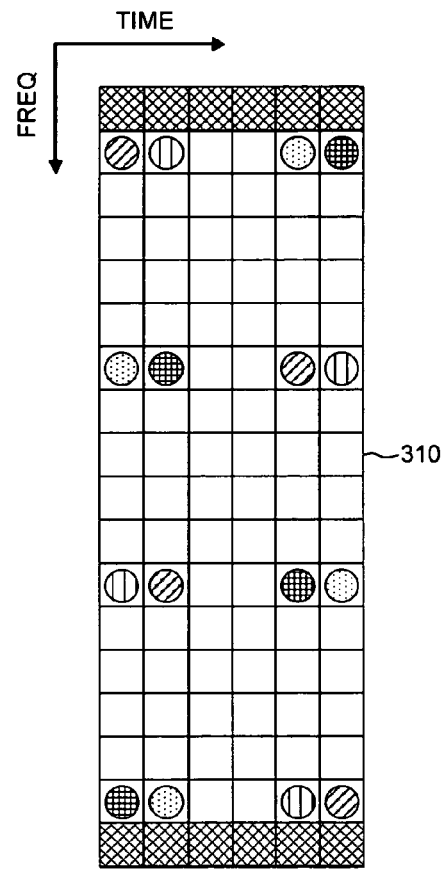
FIG. 15B
FIG. 15C

PILOT PATTERN DESIGN FOR HIGH-RANK MIMO OFDMA SYSTEMS

CROSS REFERENCE TO RELATED APPLICATIONS

This application claims priority under 35 U.S.C. §119 from U.S. Provisional Application No. 61/043,760, entitled "MIMO Pilot Structure Design," filed on Apr. 10, 2008; U.S. Provisional Application No. 61/049,786, entitled "Uplink Pilot Pattern Design," filed on May 2, 2008; U.S. Provisional Application No. 61/075,876, entitled "Pilot Pattern Design For High-Rank MIMO Systems," filed on Jun. 26, 2008; U.S. Provisional Application No. 61/094,504, entitled "Pilot Pattern Design for Small Resource Block," filed on Sep. 5, 2008; U.S. Provisional Application No. 61/109,546, entitled "Pilot Pattern Design for IEEE802.16e Legacy Support," filed on Oct. 30, 2008; U.S. Provisional Application No. 61/156,576, entitled "OFDMA System," filed on Mar. 2, 2009; the subject matter of which is incorporated herein by reference.

TECHNICAL FIELD

The disclosed embodiments relate generally to wireless network communications, and, more particularly, to pilot symbol pattern design in orthogonal frequency division multiple access (OFDMA) transmission systems.

BACKGROUND

Orthogonal Frequency-Division Multiple Access (OFDMA) is a multi-user version of the Orthogonal Frequency-Division Multiplexing (OFDM) digital modulation technology. OFDM is a special case of FDM, wherein multiple subcarriers carry the information stream and are orthogonal to each other. The orthogonality allows simultaneous transmission on multiple subcarriers without interference from each other. In OFDMA, Multiple Access is achieved by assigning subsets of subcarriers to individual users and thereby allowing simultaneous low data rate transmission for several users.

In most wireless systems, however, multipath is an undesirable common propagation phenomenon that results in radio signals reaching the receiving antenna by two or more paths. The effects of multipath include constructive and destructive interference, amplifying or attenuating the signal power seen at the receiving antenna. Multipath may also cause phase shifting of the signal. Signal variations in amplitude or phase resulted from multipath are also referred as channel response. If the receiver is able to estimate the channel response, then signal degradations caused by multipath effect can be compensated. Thus, to facilitate channel response estimation, OFDMA systems periodically insert pilot symbols, whose values are known to the receiver, into the transmission signal.

The number and the position of pilot symbols to be inserted into the transmission signal in frequency domain and time domain is referred as pilot pattern. Various techniques exist in prior art for providing pilot pattern design in an OFDM system. For example, US Patent Application No. 2006/0120272 describes a transmitting device for transmitting data symbols and pilot symbols in an OFDM system. As shown in FIG. 1 (prior art), two types of pilot symbols are orthogonal to each other and they are transmitted alternatively in frequency domain as well as in time domain.

US Patent Application No. 2006/0285484 proposes a diamond-shaped pilot pattern to achieve accurate channel estimates for high user equipment speeds while also posses the ability to use substantial pilot energy from succeeding frame with minimum latency. This improved pilot pattern is illustrated in FIG. 2 (prior art).

US Patent Application No. 2006/0209732 describes a pilot pattern design method. As shown in FIG. 3 (prior art), the proposed OFDM wireless system can change pilot patterns based on frequency selectivity and Doppler shift information.

US Patent Application No. 2007/0195688 describes spatial pilot structure for multi-antenna and multi-layer transmission wireless communications systems. In one example, a single-layer pilot pattern is extended to multi-layer pilot pattern for multi-input and multi-output (MIMO) receivers.

In OFDMA wireless systems, a resource block is defined as a two-dimensional block comprising a number of consecutive sub-carriers (also referred as frequency tones) by a number of consecutive OFDM symbols (also referred as time slots). IEEE 802.16m defines 5-symbol resource block as 18 sub-carriers by 5 OFDM symbols, 6-symbol resource block as 18 sub-carriers by 6 OFDM symbols, and 7-symbol resource block as 18 sub-carriers by 7 OFDM symbols. They are the smallest unit that can be assigned to a user of a mobile station (MS). Small sized resource blocks have better real time characteristics and they are targeted for VoIP or other small-packet application.

Pilot patterns proposed in the prior arts, however, are designed without consideration of the resource block size. Thus, in OFDMA systems, it is desirable to address optimal pilot pattern design based on predefined resource block size.

SUMMARY

In OFDMA wireless communications systems, pilot symbols are used to facilitate channel response estimation. The number and the position of pilot symbols to be inserted into the transmission signal in frequency domain and time domain is referred as pilot pattern. In the disclosed embodiments, pilot pattern design is optimized based on predefined resource block size. The number of pilots and the spacing between pilots within a resource block is determined using 2-D sampling theory based on a set of system requirements such as Doppler spread, delay spread, peak data rate, and throughput.

In a first novel aspect, pilots are allocated within a resource block to avoid channel extrapolation in both frequency domain and time domain. First, four pilots are positioned near four corners of the resource block. Next, the remaining pilots are evenly distributed within the resource block along both the frequency domain and the time domain. Finally, it is verified that an approximately equal number of pilots are evenly distributed along the time domain with respect to each data stream to minimize power fluctuation. For uplink transmission, one or more frequency tones at one or more edges of the resource block are reserved to be pilot-free to reduce multiuser synchronization error effect.

Small-size resource blocks are generally used in uplink feedback channel and sometimes in uplink data transmission. In a second novel aspect, if resource block size is smaller than three in either frequency or time domain, then the pilots are allocated such that average pilot-to-data distance is minimized and that pilot-to-pilot distance is as large as possible. In one example, m pilots are allocated in an ixj resource block. The resource block is partitioned into n equal sub blocks, where m is a multiple of n. Within each partitioned sub-block, m/n pilots are positioned such that average pilot-to-data distance is minimized. If the number of frequency tones are larger than three and i is a multiple of n, then the resource block is partitioned along the frequency domain; and if the number of time slots is larger than three and j is a multiple of n, then the resource block is partitioned along the time domain. On the other hand, if resource block size is larger than or equal to three in both frequency and time domain, then pilots are allocated to avoid channel extrapolation.

High-rank MIMO systems are systems having at least four data streams. Because high-rank MIMO supports only low-mobility environment, time-domain extrapolation is no longer a dominant factor in pilot pattern design. In a third novel aspect, in a high-rank MIMO system, pilots are allocated within a resource block to avoid channel extrapolation in frequency domain only. As a general rule, two pilots are first positioned near two edges of the resource block in frequency domain to avoid frequency-domain channel extrapolation. The remaining pilots are then equally spaced in between the allocated two pilots along frequency domain. In addition, it is verified that an approximately equal number of pilots are evenly distributed along the time domain with respect to each data stream to minimize power fluctuation. For uplink transmission, one or more frequency tones at one or more edges of the resource block are reserved to be pilot-free to reduce multiuser synchronization error effect. When continuous resource blocks are jointly used for channel estimation, the upper and lower edges of each resource block are left with blanks such that edge pilots of adjacent resource blocks are not too close to each other to improve channel estimation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 6B and 6C illustrate examples of pilot pattern design based on an 18×6 resource block in uplink transmission.

FIG. 11A and 11B illustrate examples of pilot pattern design based on a 2×6 and a 6×2 resource block in a SISO system.

FIGS. 12A and 12B illustrate examples of pilot pattern design based on a 4×6 and a 6×4 resource block in a two-stream MIMO system.

FIGS. 15B and 15C illustrate examples of pilot pattern design based on an 18×6 resource block in a four-stream MIMO system in uplink transmission.

DETAILED DESCRIPTION

Reference will now be made in detail to some embodiments of the invention, examples of which are illustrated in the accompanying drawings.

Figure 1:
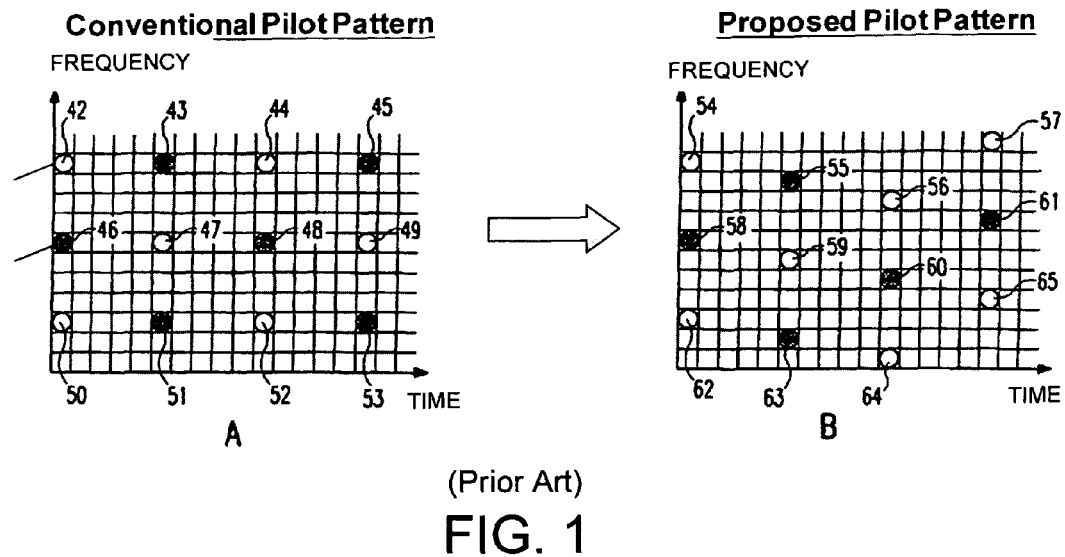
FIG. 1 (Prior Art) illustrates pilot symbols that are orthogonal to each other and are transmitted alternatively in frequency domain and in time domain.
Figure 2:
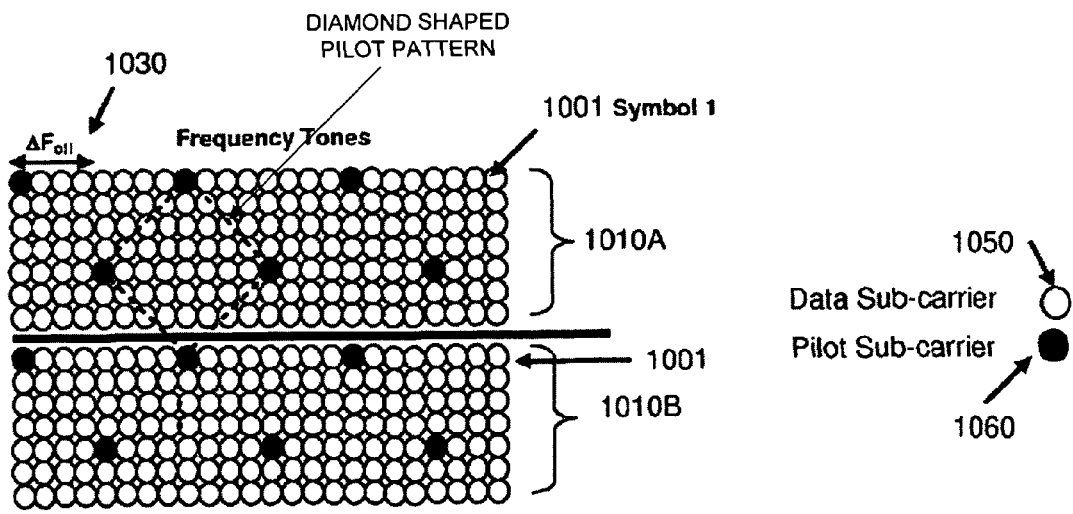
FIG. 2 (Prior Art) illustrates a diamond-shaped pilot pattern to achieve accurate channel estimation.
Figure 3:
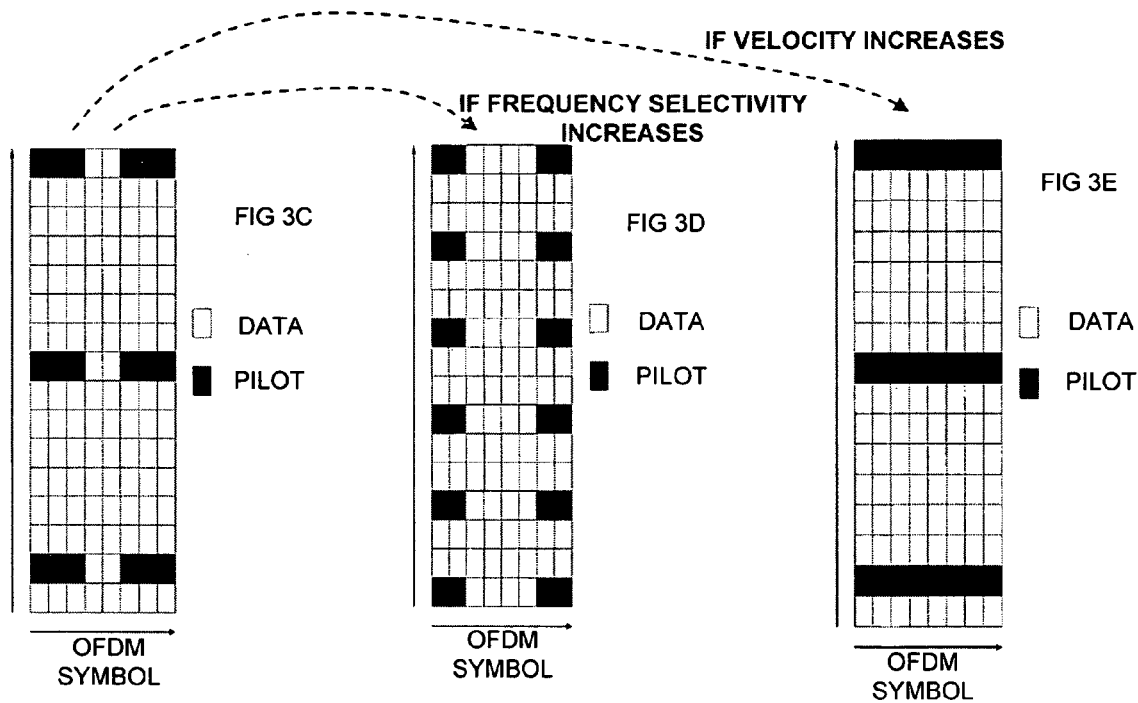
FIG. 3 (Prior Art) illustrates an OFDM wireless system that changes pilot patterns based on frequency selectivity and Doppler shift information.
Figure 4A:
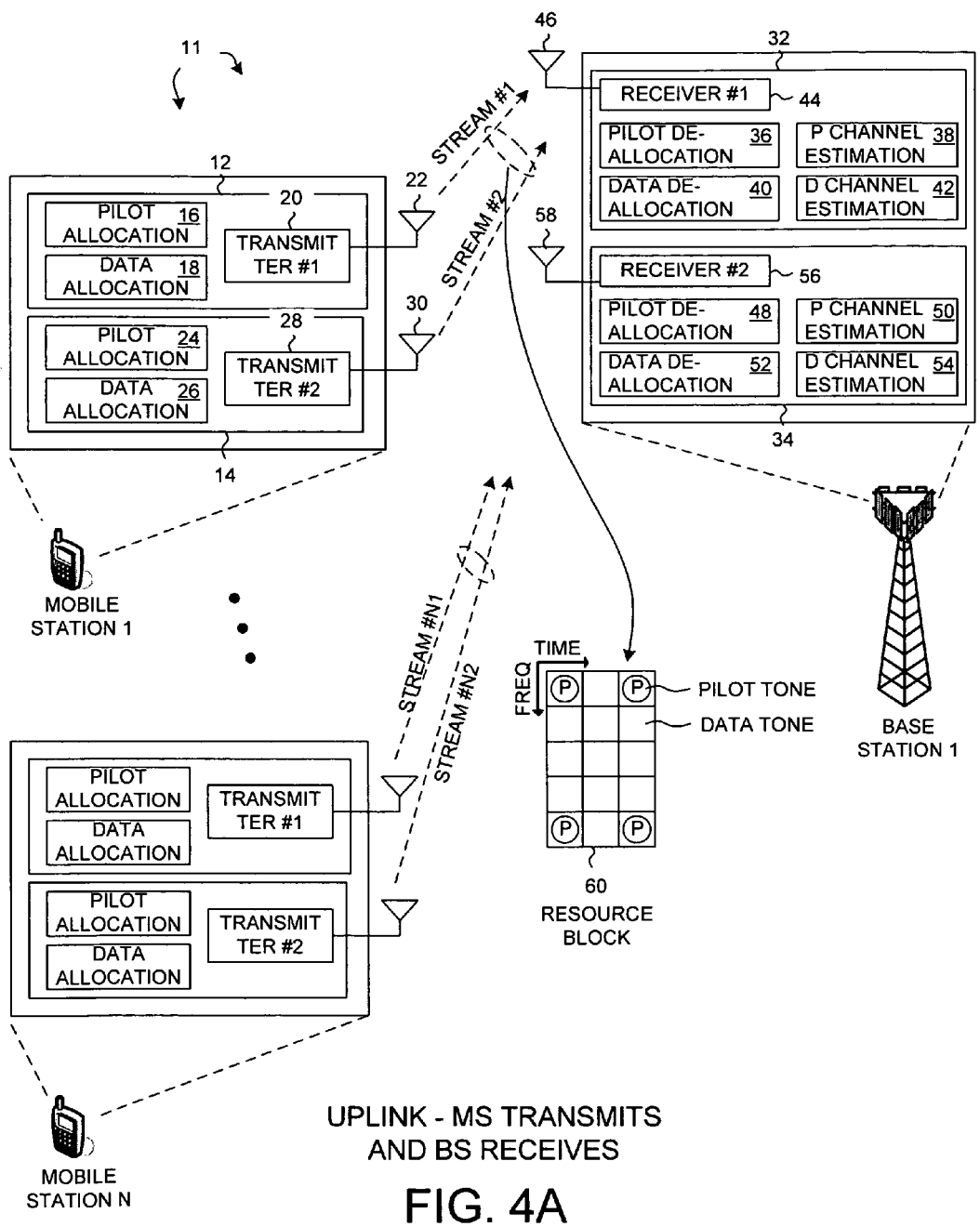
FIG. 4A is a block diagram that illustrates an OFDMA wireless system with uplink transmission.

FIG. 4A is a block diagram that illustrates an Orthogonal Frequency-Division Multiplexing Access (OFDMA) wireless communications system 11 in uplink transmission. OFDMA system 11 comprises a plurality of mobile stations MS1, MS2 . . . MSN and a base station BS1. Mobile station MS1 comprises a first transmission module 12 and a second transmission module 14. Transmission module 12 comprises a pilot allocation module 16, a data allocation module 18, and a transmitter 20 that is coupled to an antenna 22. Similarly, transmission module 14 comprises a pilot allocation module 24, a data allocation module 26, and a transmitter 28 that is coupled to an antenna 30. Base station BS1 comprises a first receiving module 32 and a second receiving module 34. Receiving module 32 comprises a pilot de-allocation module 36, a pilot-tone channel estimation module 38, a data de-allocation module 40, a data-tone channel estimation module 42, and a receiver 44 that is coupled to an antenna 46. Similarly, receiving module 34 comprises a pilot de-allocation module 48, a pilot-tone channel estimation module 50, a data de-allocation module 52, a data-tone channel estimation module 54, and a receiver 56 that is coupled to an antenna 58.

In uplink transmission, mobile stations in OFDMA system 11 transmit data streams to be received by base station BS1. Each stream is transmitted using a two-dimensional (2D) resource block comprising a number of consecutive sub-carriers (also referred as frequency tones) and a number of consecutive OFDM symbols (also referred as time slots). As illustrated in FIG. 4A, in a multi-input and multi-output (MIMO) system, mobile station MS1 transmits stream #1 from antenna 22 and stream #2 from antenna 30, and both streams are transmitted using the same resource block 60 comprising five consecutive frequency tones and three consecutive time slots. Each stream includes both pilot tones and data tones that are allocated by pilot allocation modules 16 or 24 and data allocation module 18 or 26 respectively. When base station BS1 receives stream #1 and stream #2 from MS1, its receiving modules perform pilot channel estimation followed by data channel estimation. In the example of FIG. 4A, pilot de-allocation module 36 or 48 de-allocates the pilot tones and pilot channel estimation module 38 or 50 performs pilot-tone channel estimation based on the received pilot tones. In addition, data de-allocation module 40 or 52 de-allocates the data tones and data-tone channel estimation module 42 or 54 performs interpolation or extrapolation for the received data tones.

Figure 4B:
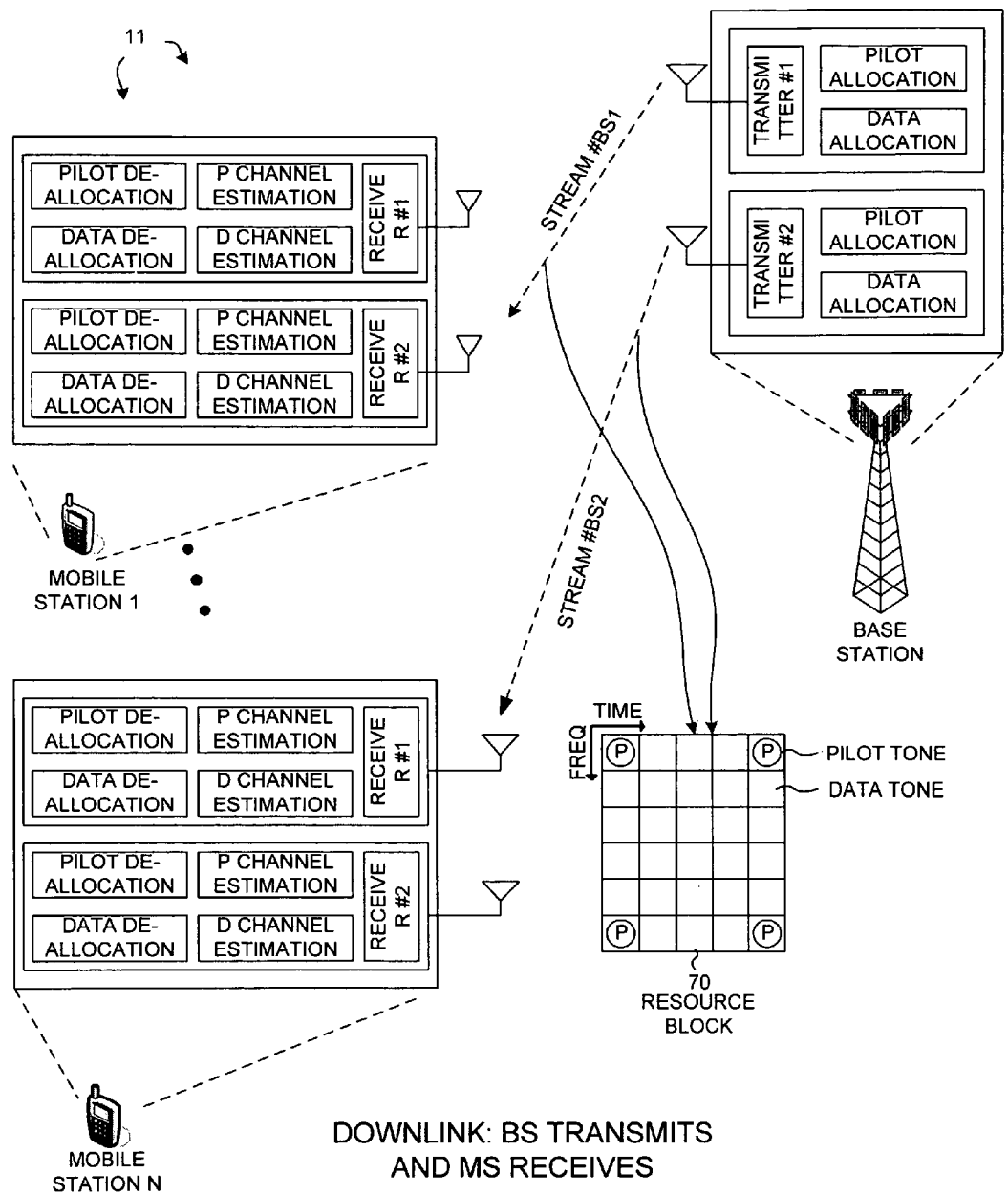
FIG. 4B is a block diagram that illustrates an OFDMA wireless system with downlink transmission.

FIG. 4B is a block diagram that illustrates OFDMA wireless communications system 11 in downlink transmission, when base station BS1 transmits data streams to be received by mobile stations MS1 to MSN. As illustrated in FIG. 4B, base station BS1 comprises transmission modules to allocate and transmit pilot and data tones, while mobile station MS1 comprises receiving modules to receive, de-allocate, and performs channel estimation for pilot and data tones. Similar to uplink transmission, each stream is transmitted using a 2D resource block comprising a consecutive number of frequency tones and time slots. In the example of FIG. 4B, stream #BS1 and stream #BS2 containing both data tones and pilot tones, are transmitted by a resource block 70 comprising six consecutive frequency tones and five consecutive time slots.

Figure 5:
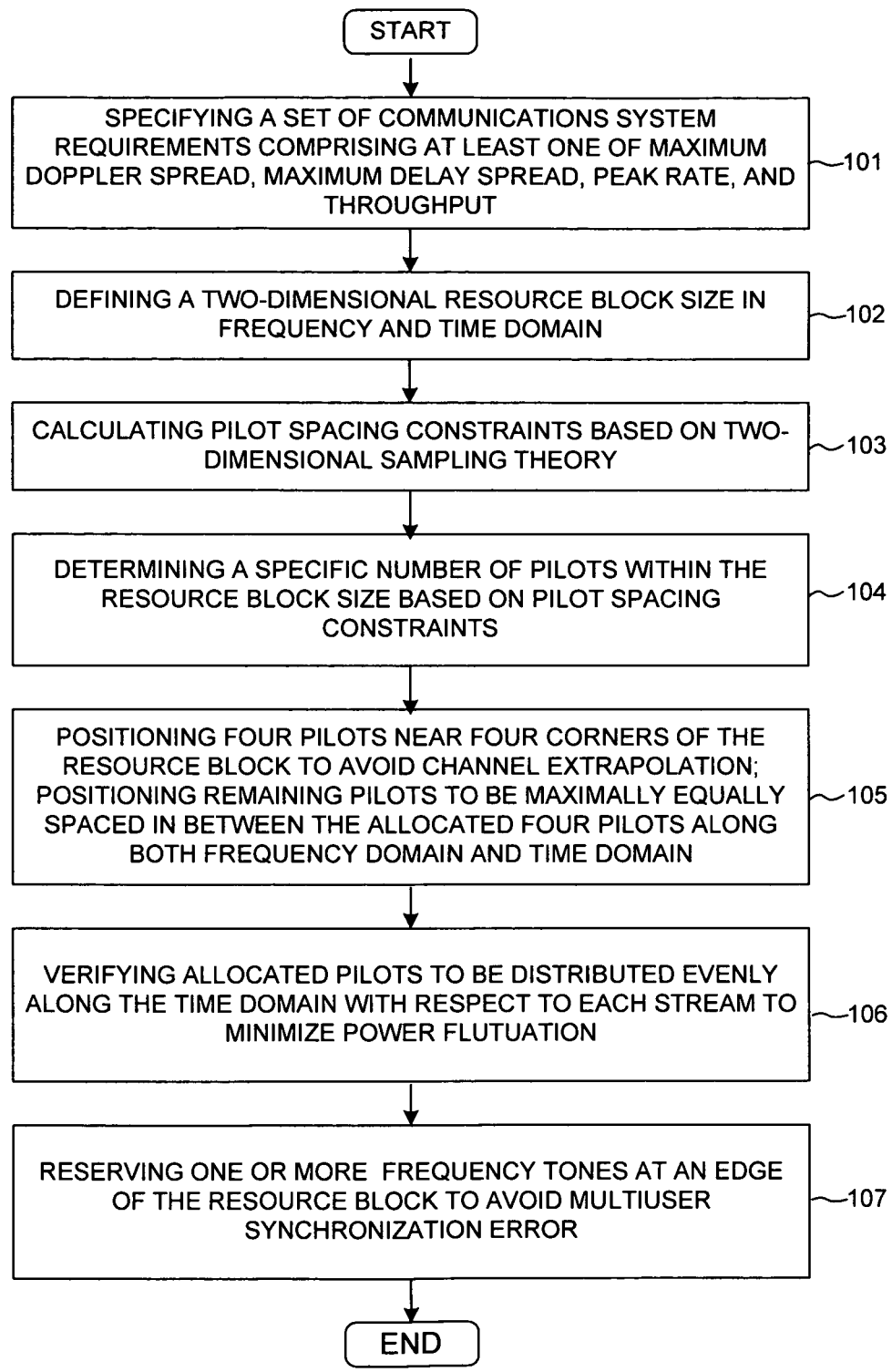
FIG. 5 is a flow chart of a method of pilot pattern design based on resource block size in an OFDMA communications system in accordance with a first novel aspect.

FIG. 5 is a flow chart of a method of pilot pattern design based on resource block size in accordance with a first novel aspect. In an OFDMA wireless communications system, pilot tones (also referred as pilot symbols) are periodically inserted into transmission signals to facilitate channel response estimation. The number and the position of pilot tones to be inserted in frequency domain and time domain is referred as pilot pattern. As illustrated in FIG. 5, pilot pattern design starts with specifying a set of communications system requirements such as Doppler spread, delay spread, peak rate, throughput, etc. (step 101). The system requirements, with two design examples, are listed in the following Table 1. In the first design example for OFDMA System 1A, a resource block of 18×6 (18 frequency tones and 6 time slots) is defined, and in the second design example for OFDMA System 1B, a resource block of 6×6 (6 frequency tones and 6 time slots) is defined (step 102).

TABLE 1

| System Parameters | System 1A | System 1B |
|---|---|---|
| Type of System | MIMO | MIMO |
| Number of streams in resource block | 2 | 2 |
| Center frequency | 2.5 GHz | 2.5 GHz |
| Bandwidth | 10 MHz | n/a |
| Peak rate | 8 bps/Hz | 5.6 bps/Hz |
| Max channel delay spread ($\tau_{max}$) | 12 µs | 12 µs |
| Max velocity (Doppler shift $f_{D, max}$) | 350 km/h (810 Hz) | 350 km/h (810 Hz) |
| Sub-carrier spacing ($\Delta f$) | 10.94 kHz | 10.94 kHz |
| OFDM symbol length ($T_{symbol}$) | 102.82 µs | 102.82 µs |
| Resource block size | 18 × 6 | 6 × 6 |
| Number of Pilots per stream | 6 | 4 |

System Requirements

In step 103, pilot spacing constraints are calculated based on 2D sampling theory using delay spread and Doppler spread. The maximum time delay that occurs of a transmission signal is called delay spread of the signal in a certain environment. The optimal spacing between pilots in frequency domain can be determined by the delay spread. The difference in Doppler shifts between different signal components contributing to a single fading channel tap is known as Doppler spread. The optimal spacing between pilots in time domain can be determined by the Doppler spread. In summary, using 2D sampling theory, space between pilots in time domain ($N_t$) and in frequency domain ($N_f$) must meet the following formulas:

$$N_t \ll \frac{1}{2 f_{D,max} T_{symbol}}$$

$$N_f \ll \frac{1}{\tau_{max} \Delta f}$$

Thus, in order to estimate the channel response in the specified environment using pilot tones, $N_t$ is the maximum space allowed between pilots in time domain and $N_f$ is the maximum spacing allowed between pilots in frequency domain. In the examples of System 1A and System 1B, $N_t$ equals to six ($N_t=1/(2\times810\times102.82\times10^{-6})=6$), and $N_f$ equals to eight ($N_f=1/(12\times10^{-6}\times10.94\times10^3)=7.6$).

For a predefined resource block, the number of the pilots to be inserted into the resource block can then be determined based on the pilot spacing constraints calculated in step 103 as well as the peak rate and throughput requirement (step 104). In the first example of System 1A, the maximum allowed number of pilots for each stream is eighteen in order to satisfy the peak rate requirement. Because the maximum required pilot spacing in frequency domain is eight ($N_f=8$) and the maximum required pilot spacing in time domain is six ($N_t=6$), for an 18×6 resource block in System 1A, there needs to be at least four pilots along the frequency domain and two pilots along the time domain. In addition, to achieve maximal throughput, the total number of pilots to be allocated within the 18×6 resource block is chosen to be six for each stream. Similarly, in the second example of System 1B, the maximum allowed number of pilots for each stream is nine in order to achieve the peak rate requirement. Thus, for a 6×6 resource block in System 1B, there needs to be at least two pilots along the frequency domain and two pilots along the time domain.

In addition, to achieve maximal throughput, the total number of pilots to be allocated in a 6×6 resource block is chosen to be four for each stream.

Once the number of pilots to be inserted into a predefined resource block is determined, the pilots are then positioned into certain locations within the resource block to avoid channel extrapolation (step 105). When pilots are used for channel response estimation in time domain and frequency domain, an extrapolation using previous pilot symbols may be performed. Alternatively, an interpolation using the nearest pilot symbols or a linear interpolation using previous and subsequent pilot symbols may be performed. It is well known that extrapolation degrades channel estimation quality especially when a mobile station moves (for example, in a car) with a non-negligible speed, as compared to interpolation. Therefore, extrapolation should be prevented as much as possible while keeping similar pilot overhead and channel response estimation complexity.

In general, channel extrapolation can be prevented or limited by allocating pilots at resource block boundaries in both time and frequency domains. When positioning pilot symbols close to edges of a resource block, pilot symbols frame most the data symbols. As a result, most data symbols would have a previous symbol and a subsequent symbol required to perform channel interpolation.

Figure 6A:
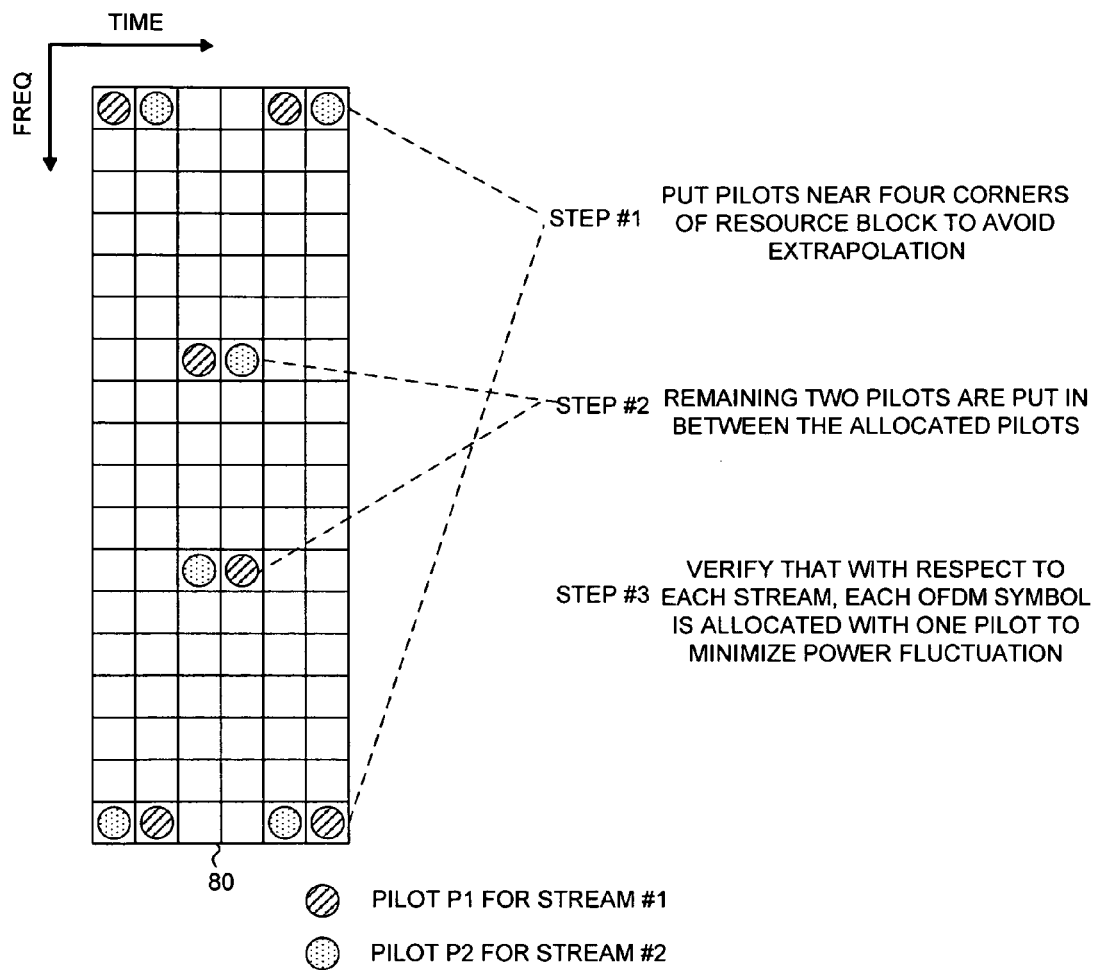
FIG. 6A is an example of pilot pattern design based on an 18×6 resource block.

FIG. 6A illustrates an example of pilot pattern based on an 18×6 resource block 80 in System 1A to achieve optimal channel response estimation. In the example of FIG. 6A, two data streams stream#1 and stream#2 are transmitted by resource block 80 having eighteen consecutive frequency tones and six consecutive time slots. As described above with respect to step 104 of FIG. 5, a total number of six pilots are to be allocated, and there need to be at least four pilots along the frequency domain and at least two pilots along the time domain for each data stream within the 18×6 resource block. As illustrated in FIG. 6A, according to step 105 of FIG. 5, four pilots are first allocated near four corners of resource block 80 to avoid channel extrapolation for each data stream (step #1). The remaining two pilots are then maximally equally spaced in between the allocated four pilots along the frequency domain and the time domain for each data stream (step #2). Optimal channel response estimation is thus achieved by this novel pilot pattern design.

Going back to FIG. 5, it is further verified that the allocated pilots are evenly distributed along the time domain for each data stream (step 106). This is because when power boosting is applied for transmitting pilot symbols, multiple pilots allocated on the same time slot typically introduce significant power fluctuation. Thus, as illustrated in FIG. 6A, it should be verified that with respect to each data stream, each time slot has no more than one pilot allocated such that power fluctuation is minimized (step #3).

Figure 7:
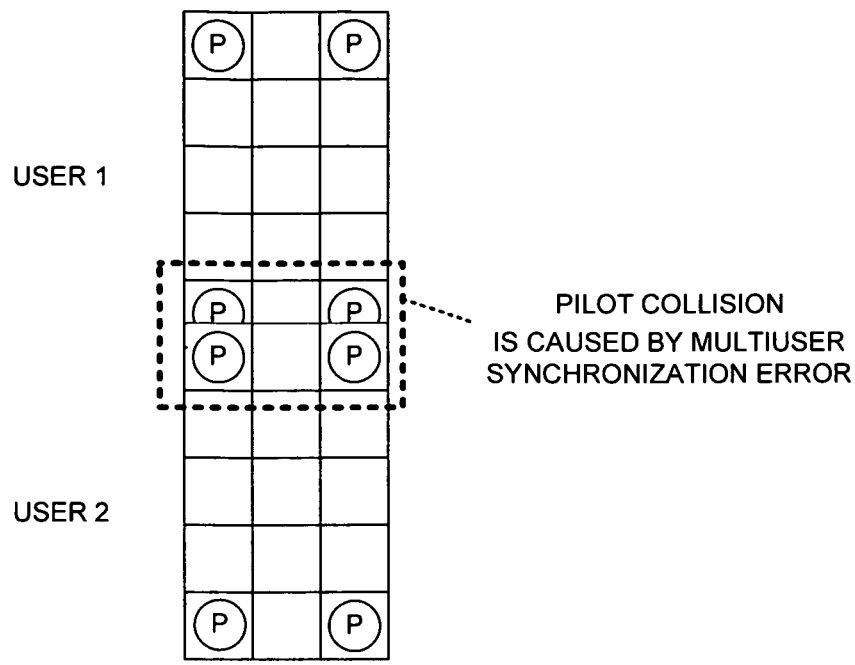
FIG. 7 illustrates pilot collision caused by multiuser synchronization error.

FIG. 7 illustrates pilot symbol collision due to multiuser synchronization error. In a broadband multiuser environment, an OFDMA based system has strong advantage in attaining high spectral efficiency, particularly for downlinks, as it has the advantage in using low complexity frequency-domain equalizers if the channel does not change much during one OFDM symbol. For uplinks, however, it is not apparent that OFDMA would be an appropriate solution in the multiuser uplink scenario, because accurate uplink multiuser frequency synchronization is a challenging task.

As illustrated in FIG. 7, when frequency synchronization error occurs in a multiuser uplink scenario, the last frequency tone in a resource block would collide with the first frequency tone in a subsequent resource block. As a result, the pilots at the boundary of a resource block would not be distinguishable when uplink synchronization error occurs. Thus, pilots allocated at the boundaries of two adjacent resource blocks would not be recoverable due to multiuser collision. This would significantly affect channel estimation and prediction in a multiuser uplink transmission. Therefore, it is critical to insure a reliable pilot transmission by avoiding pilot collision due to synchronization error.

Going back to FIG. 5, to avoid pilot collision due to multiuser synchronization error, when pilot symbols are allocated for uplink transmission, a buffer region is reserved at one or more edges of each resource block-(step 107). This effectively avoids pilot collision if the first frequency tone in a resource block overlaps with the last frequency tone of the adjacent resource block in frequency domain due to frequency synchronization errors.

FIG. 6B illustrates an example of reserving buffer regions at one or more edges of resource block 80. In the example of FIG. 6B, the buffer regions adjacent to pilot tones in resource block 80 are reserved to be pilot-free where no pilots are allocated. When frequency synchronization error occurs, the first two frequency tones may interfere with the last two frequency tones of the adjacent resource block in frequency domain. However, with pilot placement shown as in FIG. 6B, the pilots (P1s and P2s) in the first two frequency tones would not collide with the pilots (P2s and P1s) in the last two frequency tones of the adjacent resource block.

FIG. 6C illustrates another example, where the entire row of the first and the last frequency tones in resource block 80 are reserved to be pilot-free buffer region where no pilots are allocated. In this approach, frequency synchronization error, if only affecting the first and last frequency tones of a resource block, would not have any effect on pilot transmission. Therefore, it is a robust pattern to handle frequency synchronization error. On the other hand, because all pilots are moved away from the boundary frequency tones, they frame and enclose less data symbols. As a result, this pilot pattern design would require more channel extrapolation than the pilot pattern design illustrated in FIG. 6B.

Figure 8A:
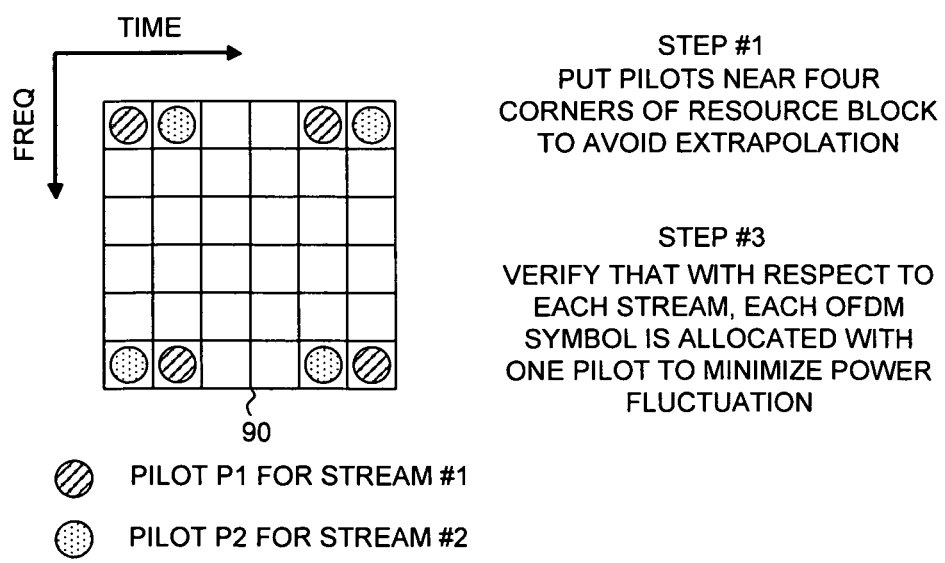
FIG. 8A is an example of pilot pattern design based on a 6×6 resource block.

FIG. 8A illustrates an example of pilot pattern based on a 6×6 resource block 90 of System 1B to achieve optimal channel response estimation. In the example of FIG. 8A, two data streams stream#1 and stream#2 are transmitted by resource block 90 having six consecutive frequency tones and six consecutive time slots. As described above with respect to step 104 of FIG. 5, a total number of four pilots are to be allocated, and there need to be at least two pilots along the frequency domain and at least two pilots along the time domain for each data stream within the 6×6 resource block. As illustrated in FIG. 8A, according to step 105 of FIG. 5, four pilots of each data stream are allocated near four corners of resource block 90 to avoid channel extrapolation for each data stream (step #1). Optimal channel response estimation is thus achieved by this novel pilot pattern design. Next, according to step 106 of FIG. 5, it is further verified that, with respect to each data stream, each time slot has no more than one pilot allocated such that power fluctuation is minimized (step #3).

Figure 8B:
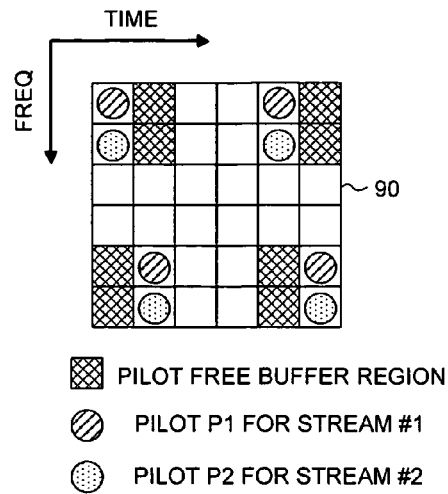
FIG. 8B-8E illustrate examples of pilot pattern design based on a 6×6 resource block in uplink transmission.

For uplink transmission, further adjustment for pilot pattern is desirable to prevent pilot collision due to multiuser synchronization error. FIG. 8B, FIG. 8C, FIG. 8D and FIG. 8E illustrate four different pilot pattern adjustment schemes. All these pilot pattern designs follow the same principle while each of them may have its own advantage over different environment. In FIG. 8B, pilots at four corners are rearranged for reserving pilot-free buffer regions to avoid pilot collision due to frequency synchronization errors. More specifically, with respect to resource block 90, in the frequency direction, the top row is the smallest frequency tone, the second row from the top is the second smallest frequency tone, the second row from the bottom is the second largest frequency tone, and the bottom row has the largest frequency tone. In the time direction, the leftmost column is the smallest time slot, the second column from the left is the second smallest time slot, the second column from the right is the second largest time slot, and the rightmost column is the largest time slot. Thus, for stream#1, a first P1 is positioned at the smallest frequency tone and the smallest time slot, a second P1 is positioned at the smallest frequency tone and the second largest time slot, a third P1 is positioned at the second largest frequency tone and the second smallest time slot, and a fourth pilot P1 is positioned at the second largest frequency tone and the largest time slot. For stream#2, each pilot P2 is located at one row lower to each pilot P1 respectively. In other words, each P2 is located at the next larger frequency tone and the same time slot with respect to a corresponding P1. The middle two time slots are remained as pilot-free.

Figure 8C:
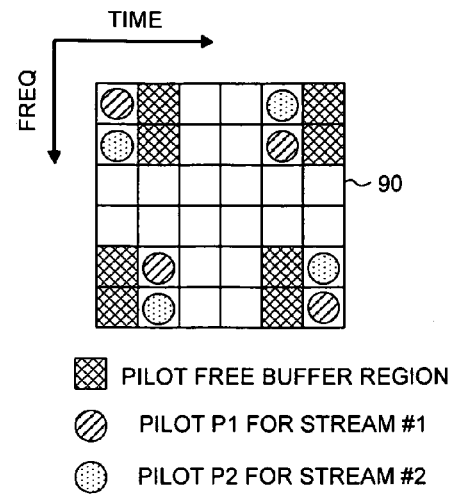
Figure 8D:
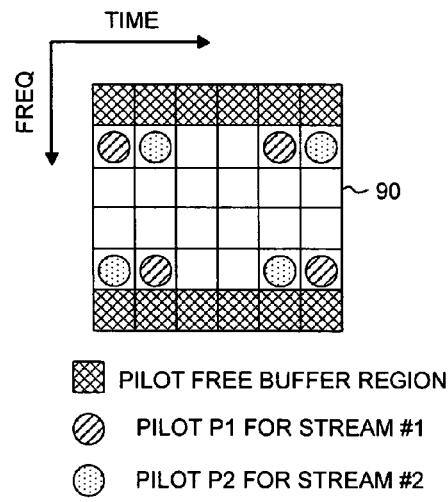
Figure 8E:
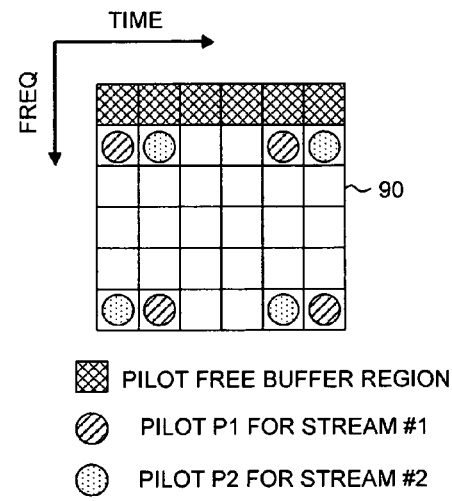

Compare to FIG. 8B, pilot pattern in FIG. 8C covers more frequency tones by allocating each pilot of each stream on different frequency tones. In FIG. 8D, the entire top and bottom frequency tones are reserved as a pilot-free buffer region. It is therefore a very robust pattern for preventing frequency synchronization error while not optimal for avoiding channel extrapolations. Compare to FIG. 8D, pilot pattern in FIG. 8E reserves only the top frequency tone as pilot-free buffer region to prevent pilots collision. Therefore, this may provide a good trade-off between preventing frequency synchronization error and avoiding channel extrapolation.

Figure 9A:
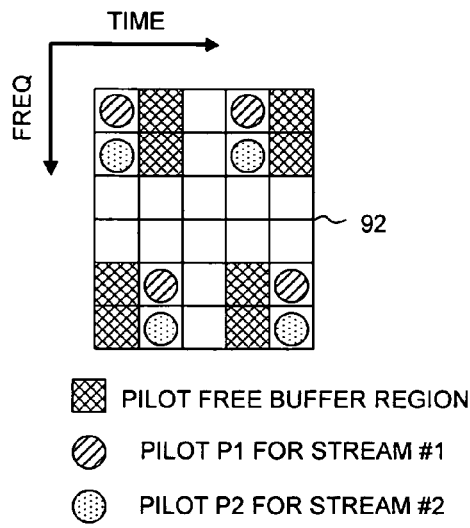
FIGS. 9A and 9B illustrate examples of pilot pattern design based on a 6×5 and a 6×7 resource block.
Figure 9B:
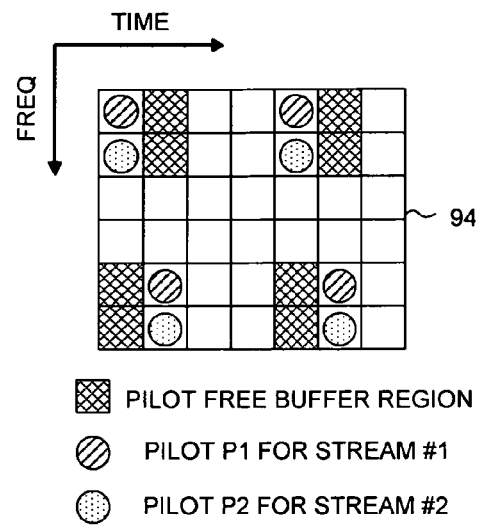

The above-illustrated novel pilot allocation schemes can be easily extended to resource blocks with different sizes. FIGS. 9A and 9B illustrate examples of pilot pattern in a 6×5 resource block 92 and in a 6×7 resource block 94 for uplink transmission. In the example of FIG. 9A, the pilots are still positioned near four corners of resource block 92 but with a middle pilot-free time slot removed as compared to FIG. 8B. In the example of FIG. 9B, the pilots are positioned exactly in the same location as in FIG. 8B, with the rightmost time slot carrying data only. This arrangement can minimize the changes of channel estimation coefficients, since the channel estimation coefficients of the 6×6 resource block can be used in the first six time slots of the 6×7 resource block when 6-symbol and 7-symbol resource blocks co-exist in a system.

The indices of the data streams illustrated in the above examples are in a logical sense. They can be interchanged without affecting the pilot patterns. Moreover, the MIMO pilot patterns can be directly utilized in a SISO system by removing pilots for stream#1 or stream#2. The positions of the removed pilots are used to allocate data.

Pilot Design for Small-Size Resource Block

For pilot pattern design with reduced overhead and thus less density, channel extrapolation is inevitable and usually happens at symbols near the resource block boundaries because these symbols may have neither previous nor subsequent pilots needed for channel interpolation. This is particularly true when the size of resource block is small. Small-size resource block in general is used for uplink feedback channel and sometimes for uplink data transmission. For example, an uplink resource block may consist of as few as two consecutive sub-carriers or two consecutive OFDM symbols. As a result, it would introduce increased overhead and thus it would no longer be desirable to position four pilots near four corners within the small resource block.

Figure 10:
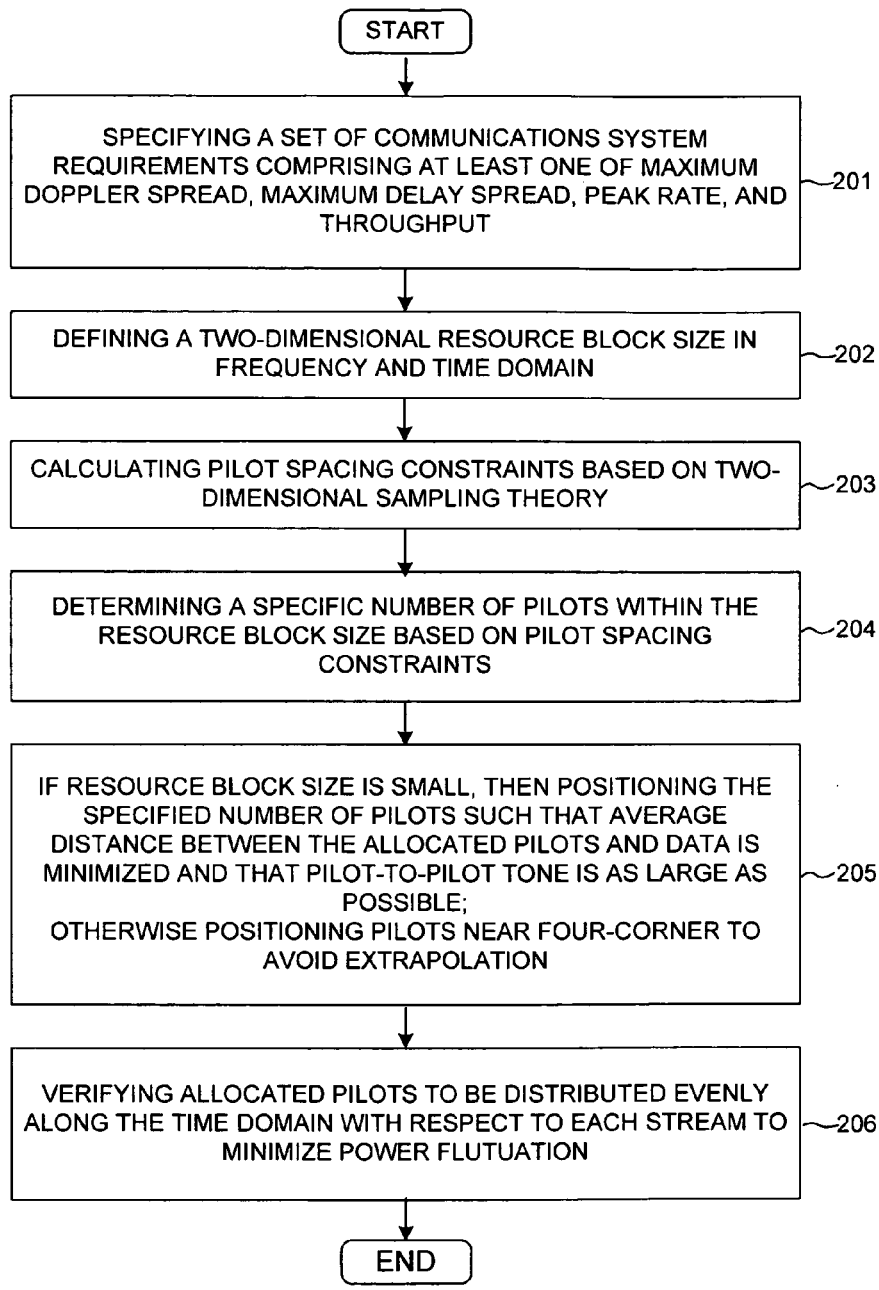
FIG. 10 is a flow chart of a method of pilot pattern design based on small resource block size in an OFDMA communications system in accordance with a second novel aspect.

FIG. 10 is a flow chart of a method of pilot pattern design based on small resource block size in accordance with a second novel aspect. As illustrated in FIG. 10, the beginning steps 201 to 204 of pilot pattern design are the same as steps 101 to 104 illustrated in FIG. 5. The system requirements, with three design examples, are listed in the following Table 2. In the first design example of OFDMA System 2A, a resource block of 2×6 or 6×2 in a SISO system is defined. In the second design example of OFDMA System 2B, a resource block of 4×6 or 6×4 in a two-stream MIMO system is defined. In the third example of OFDMA System 2C, a resource block of 4×6 or 6×4 in a SISO system is defined.

Based on 2D sampling theory, the maximum required pilot spacing in frequency domain is eight ($N_f=8$) and the maximum required pilot spacing in time domain is six ($N_t=6$) in all three systems. Thus, for all three systems, there need to be at least two pilots in frequency direction and two pilots in time direction based on their resource block sizes. With additional system peak rate and throughput consideration, the number of pilots to be allocated for each stream within each resource block is chosen to be two in System 2A and System 2B, and to be four in System 2C.

TABLE 2

| System Parameters | System Requirements | | |
|---|---|---|---|
| | System 2A | System 2B | System 2C |
| Type of System | SISO | MIMO | SISO |
| Number of streams | 1 | 2 | 1 |
| Center frequency | 2.5 GHz | 2.5 GHz | 2.5 GHz |
| Bandwidth | 10 MHz | 10 MHz | 10 MHz |
| Max channel delay spread ($\tau_{max}$); | 12 µs | 12 µs | 12 µs |
| Max velocity (Doppler shift $f_{D, max}$); | 350 km/h (810 Hz) | 350 km/h (810 Hz) | 350 km/h (810 Hz) |
| Sub-carrier spacing ($\Delta f$); | 10.94 kHz | 10.94 kHz | 10.94 kHz |
| OFDM symbol length ($T_{symbol}$); | 102.82 µs | 102.82 µs | 102.82 µs |
| Resource block size | 2 × 6 and 6 × 2 | 4 × 6 and 6 × 4 | 4 × 6 and 6 × 4 |
| Number of Pilots per stream | 2 | 2 | 4 |

Once the specific number of pilots to be allocated is determined, the pilots are then positioned at certain locations within each resource block under the rules illustrated in step 205 of FIG. 10. If the resource block size is smaller than three in either frequency or time direction, then the pilots are positioned such that the average distance between the allocated pilot and data is minimize and that pilot-to-pilot distance is as large as possible. On the other hand, if the resource block size is larger than or equal to three in both frequency and time direction, then the pilots are positioned to avoid channel extrapolation.

FIGS. 11A and 11B illustrate examples of pilot pattern design based on a 2×6 resource block and a 6×2 resource block in System 2A. In the example of FIG. 11A the 2×6 resource block 210 is partitioned along the time domain into two equal size sub-blocks. Each pilot is positioned in the center time slot of each sub-block such that the average pilot-to-data distance is minimized. In addition, each pilot is positioned in different frequency tone such that pilot-to-pilot distance is as large as possible. Similarly, in the example of 11B, the 6×2 resource block 220 is partitioned along the frequency domain into two equal size sub-blocks. Each pilot is positioned in the center frequency tone of each sub-block such that the average pilot-to-data distance is minimized. In addition, each pilot is positioned in different time slot such that pilot-to-pilot distance is as large as possible. As a result, channel estimation performance can be improved.

As a general rule, for small-size resource block that is smaller than three in either frequency or time direction, if m pilots are to be allocated in a ixj resource block, then the resource block is partitioned into n equal sub-blocks where m is a multiple of n. If i is less than three and j is equal to or greater than three, then j must be a multiple of n and the ixj resource block is partitioned into n sub-blocks along the time domain. The m/n pilots are allocated in each of the partitioned sub-blocks such that average pilot-to-data distance is minimized. On the other hand, if j is less than three and is equal to or greater than three, then i must be a multiple of n and the ixj resource block is partitioned into n sub-blocks along the frequency domain. The m/n pilots are allocated in each of the partitioned sub-blocks such that average pilot-to-data distance is minimized.

FIGS. 12A and 12B illustrate examples of pilot pattern design based on a 4×6 resource block 230 and a 6×4 resource block 240 in System 2B. Because the size of resource blocks 230 and 240 is larger than or equal to three in both frequency and time direction, the pilots are allocated such that channel extrapolation can be avoided. In the example of FIG. 12A, two pilots for stream#1 are positioned diagonally at two corners of resource block 230 while two pilots for stream#2 are positioned diagonally at the other two corners of resource block 240. Similarly, in the example of FIG. 12B, two pairs of pilots for stream#1 and stream#2 are positioned diagonally at four corners of resource block 240. As a result, channel extrapolation is avoided as much as possible. The indices of the two data streams illustrated in FIGS. 12A and 12B are in a logical sense. They can be interchanged without affecting the pilot patterns.

Figure 13A:
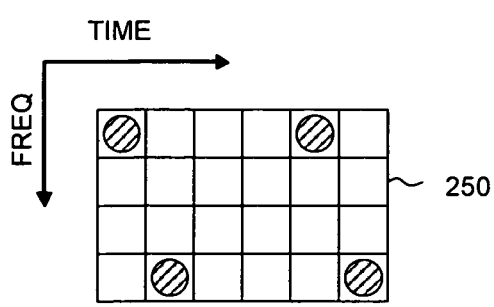
FIGS. 13A and 13B illustrate examples of pilot pattern design based on a 4×6 and a 6×4 resource block in a SISO system.
Figure 13B:
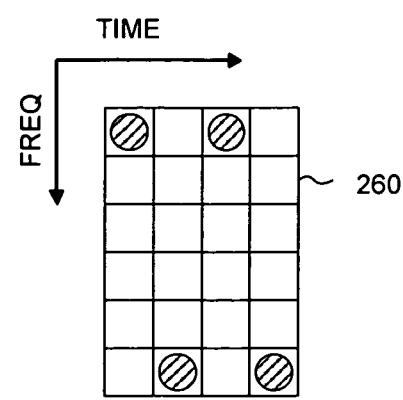

FIGS. 13A and 13B illustrate examples of pilot pattern design based on a 4×6 resource block 250 and a 6×4 resource block 260 in System 2C. In both examples of FIG. 13A and FIG. 13B, four pilots are positioned at four corners of resource block 250 and 260, respectively. In addition, two diagonal pilots are adjusted by shifting inside by one time slot such that power fluctuation caused by pilot power boosting is minimized.

Pilot Pattern Design for High-Rank MIMO Systems

MIMO technology has attracted attention in wireless communications systems because it offers significant increases in data throughput without additional bandwidth requirement. In a multi-antenna MIMO system, each data stream is transmitted by a corresponding antenna using the same resource block. For high-rank MIMO systems where the number of streams is at least four or more, the number of pilots to be allocated for each stream is more critical. Thus, the optimal design of pilot pattern is particularly complex in high-rank MIMO OFDMA systems. Typically, the number of pilots to be allocated for each stream is generally chosen to be not too big to achieve high throughput and at the same time not too small to obtain good channel estimation quality.

Figure 14:
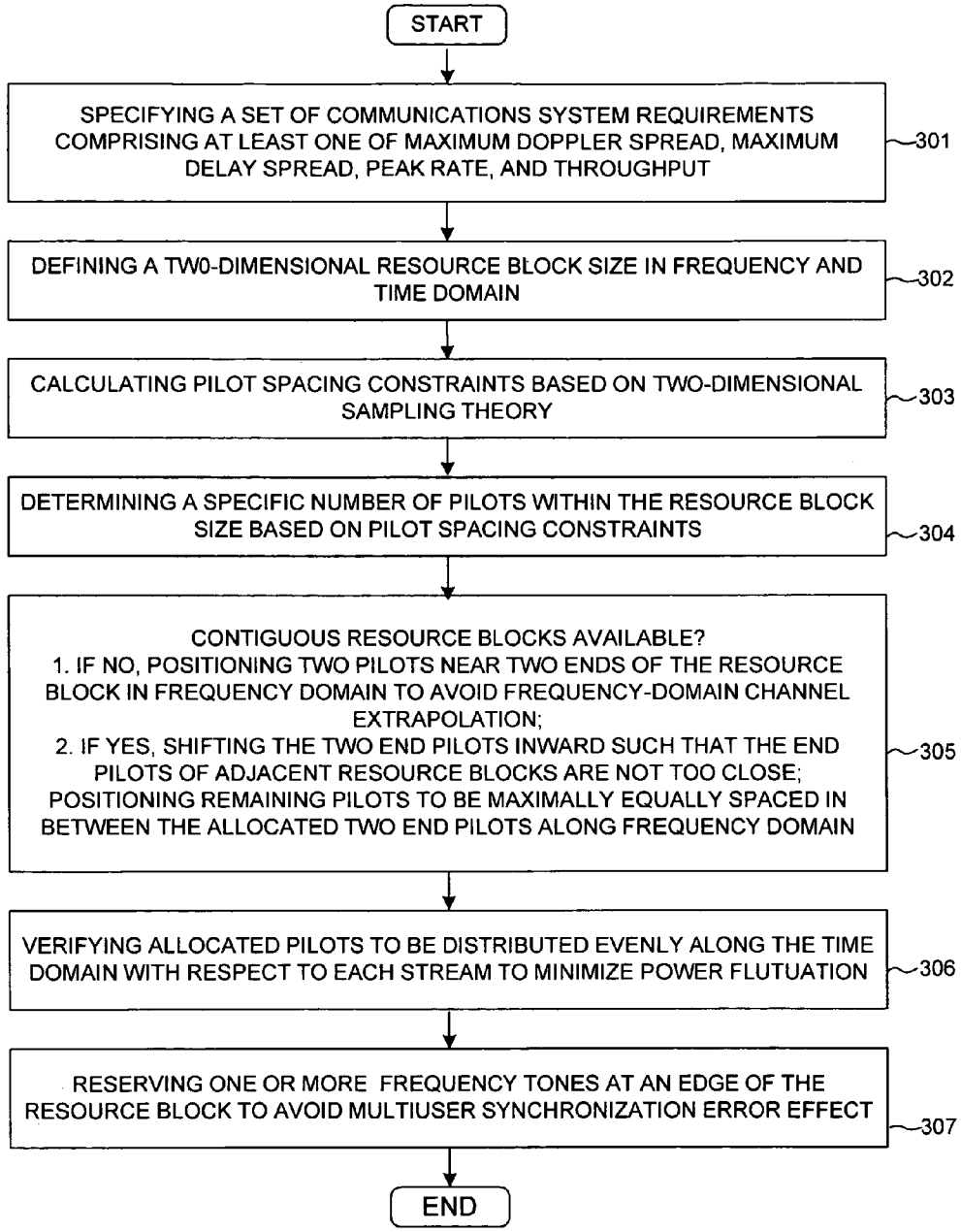
FIG. 14 is a flow chart of a method of pilot pattern design in a high-rank MIMO system in accordance with a third novel aspect.

FIG. 14 is a flow chart of a method of pilot pattern design in a high-rank MIMO OFDMA communications system in accordance with a third novel aspect. As illustrated in FIG. 14, the beginning steps 301 to 304 of pilot pattern design are the same as steps 101 to 104 illustrated in FIG. 5. The system requirements, with three design examples, are listed in the following Table 3.

TABLE 3

| System Parameters | System Requirements | | |
| --- | --- | --- | --- |
| | System 3A | System 3B | System 3C |
| Type of System | MIMO | MIMO | MIMO |
| Number of streams | 4 | 8 | 8 |
| Peak rate | 15 bps/Hz | 30 bps/Hz | 30 bps/Hz |
| Max channel delay spread ($\tau_{max}$); | 10 μs | 10 μs | 10 μs |
| Sub-carrier spacing ($\Delta f$); | 10.94 kHz | 10.94 kHz | 10.94 kHz |
| OFDM symbol length ($T_{symbol}$); | 102.82 μs | 102.82 μs | 102.82 μs |
| Resource block size | 18 × 6 | 18 × 6 | 36 × 6 |
| Number of Pilots per stream | 4 | 3 | 5 |

In the first design example of OFDMA System 3A, a resource block of 18×6 in a four-stream MIMO system is defined. The number of pilots per resource block is chosen to be four in order to achieve throughput and to obtain good channel estimation quality. In the second design example of OFDMA System 3B, a resource block of 18×6 in an eight-stream MIMO system is defined and the number of pilots per resource block is chosen to be three to achieve throughput and to obtain good channel estimation quality. In the third example of OFDMA System 3C, a resource block of 36×6 in an eight-stream MIMO system is defined and the number of pilots per resource block is chosen to be five to achieve throughput and to obtain good channel estimation quality.

Once the specific number of pilots to be allocated is determined, the pilots are then positioned at certain locations within each resource block under the rules illustrated in step 305 of FIG. 14. Because high-rank MIMO systems typically operate in low-mobility environment (time variation is not severe), time domain extrapolation is no longer a dominant factor. Thus, pilots are allocated to avoid channel extrapolation in frequency domain only. Two different cases are considered. In the first case, only one resource block is available for channel estimation; and in the second case, two or more adjacent resource blocks are available to be jointly used for channel estimation. As a general rule, for the first case, two pilots are first positioned near two edges of each resource block in frequency domain to avoid frequency-domain channel extrapolation. The remaining pilots are then positioned such that they are equally spaced in between the allocated two pilots along the frequency domain. For the second case, the end pilots of each resource block should be shifted inward by several frequency tones such that end pilots of resource blocks are not too close. The remaining pilots are then positioned such that they are equally spaced in between the allocated two pilots along the frequency domain.

In step 306 of FIG. 14, it is further verified that with respect to each stream no more than one pilot is allocated in a time slot, so as to minimize power fluctuation. In addition, in order to avoid pilot collision due to multiuser synchronization error, when pilot symbols are allocated for uplink transmission, buffer regions are reserved at one or more edges of each resource block (step 307).

Figure 15A:
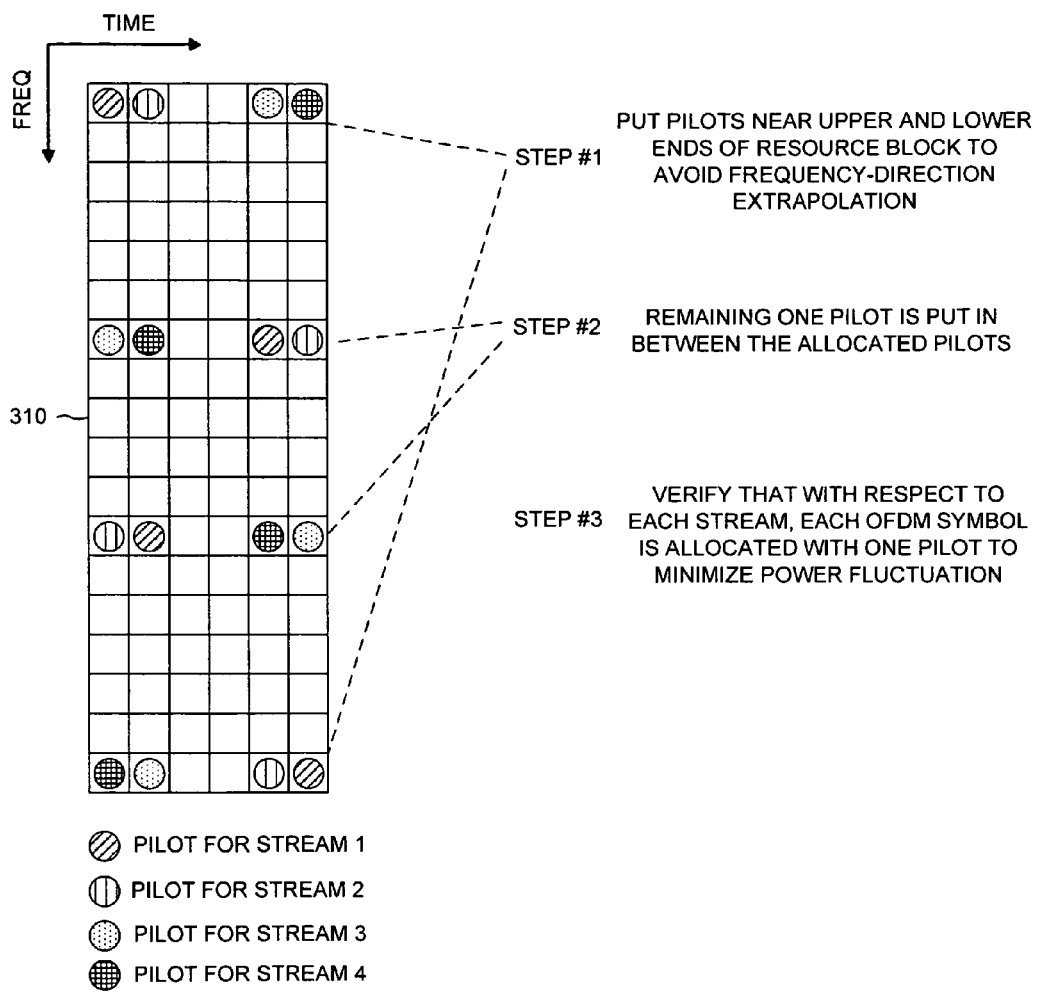
FIG. 15A illustrates an example of pilot pattern design based on an 18×6 resource block in a four-stream MIMO system.

FIG. 15A illustrates an example of pilot pattern design in an 18×6 resource block 310 of a four-stream MIMO OFDMA System 3A. The number of pilots to be allocated per data stream is four. As illustrated in FIG. 15A, for each data stream, two pilots are positioned at the top edge and the bottom edge of resource block 310 along the frequency domain (step #1). The remaining two pilots are maximally equally spaced in between the allocated two pilots along the frequency domain (step #2). Although time-direction channel extrapolation is no longer a dominant factor, pilots are positioned as far as possible along the time domain. Thus, as illustrated in FIG. 15A, no pilots are positioned in the entire two middle time slots. In the example of FIG. 15A, it is further verified that with respect to each data stream, each time slot has no more than one pilot allocated such that power fluctuation is minimized (step #3).

FIG. 15B illustrates an example of reserving buffer regions at one or more edges of resource block 310 to reduce multiuser synchronization error effect. In the example of FIG. 15B, the buffer regions adjacent to pilot tones in resource block 310 are reserved to be pilot-free where no pilots are allocated. When frequency synchronization error occurs, the first two frequency tones may interfere with the last two frequency tones of the adjacent resource block in frequency domain. However, with pilot placement shown as in FIG. 15B, the pilots in the first two frequency tones would not collide with the last two frequency tones of the adjacent resource block.

FIG. 15C illustrates another example, where the entire first and last frequency tones in resource block 310 are reserved to be pilot-free buffer region where no pilots are allocated. In this approach, frequency synchronization error, if only affecting the first and last frequency tones of a resource block, would not have any effect on pilot transmission. The indices of the four data streams illustrated in FIGS. 15A, 15B and 15C are in a logical sense. They can be interchanged without affecting the pilot patterns.

Figure 16A:
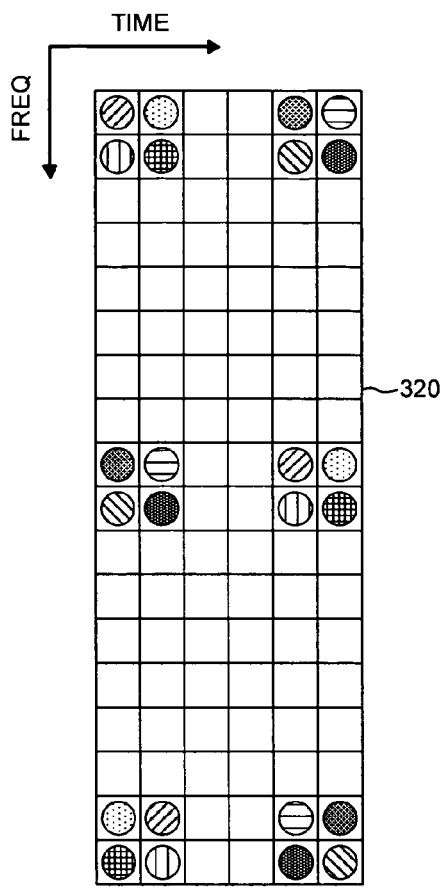
FIG. 16A illustrates an example of pilot pattern design based on an 18×6 resource block in an eight-stream MIMO system.

FIG. 16A illustrates an example of pilot pattern design based on an 18×6 resource block 320 in an eight-stream MIMO OFDMA System 3B. The number of pilots to be allocated per data stream is three. As illustrated in FIG. 16A, for each data stream, two pilots are positioned at the top edge and the bottom edge of resource block 320 along the frequency domain. The remaining one pilot is located in the middle of the allocated two pilots along the frequency domain. As illustrated in FIG. 16A, pilots are positioned as far as possible along the time domain to reduce channel extrapolation. In addition, it is further verified that with respect to each data stream, each time slot has no more than one pilot allocated such that power fluctuation is minimized.

Figure 16B:
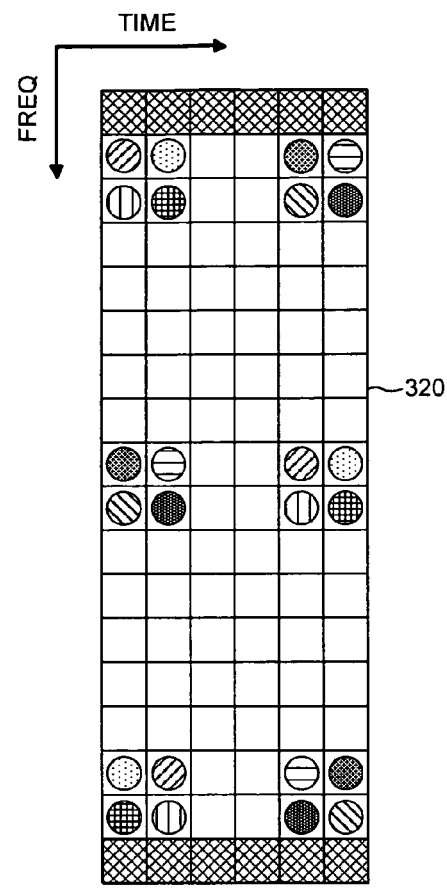
FIG. 16B illustrates an example of pilot pattern design based on an 18×6 resource block in an eight-stream MIMO system in uplink transmission.

FIG. 16B illustrates an example of reserving buffer regions at one or more edges of resource block 320. In the example of FIG. 16B, the entire first and last frequency tones are reserved to be pilot-free buffer region where no pilots are allocated. In this approach, frequency synchronization error, if only affecting the first and last frequency tones of a resource block, would not have any effect on pilot transmission.

Figure 17A:
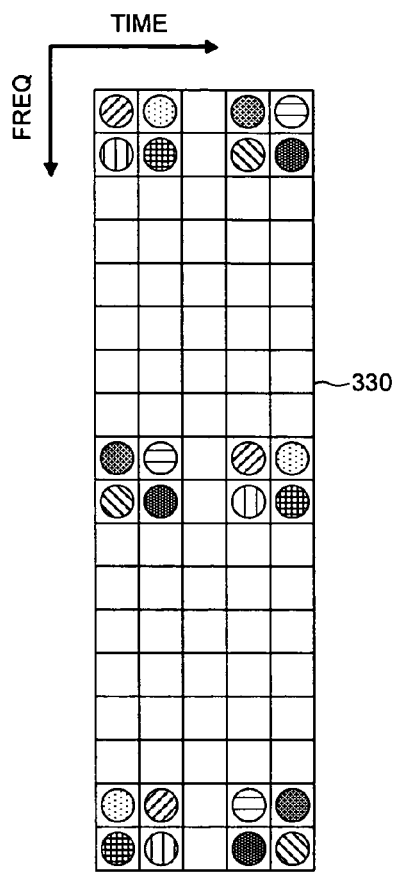
FIGS. 17A and 17B illustrate examples of pilot pattern design based on an 18×5 and an 18×7 resource block in an eight-stream MIMO system.
Figure 17B:
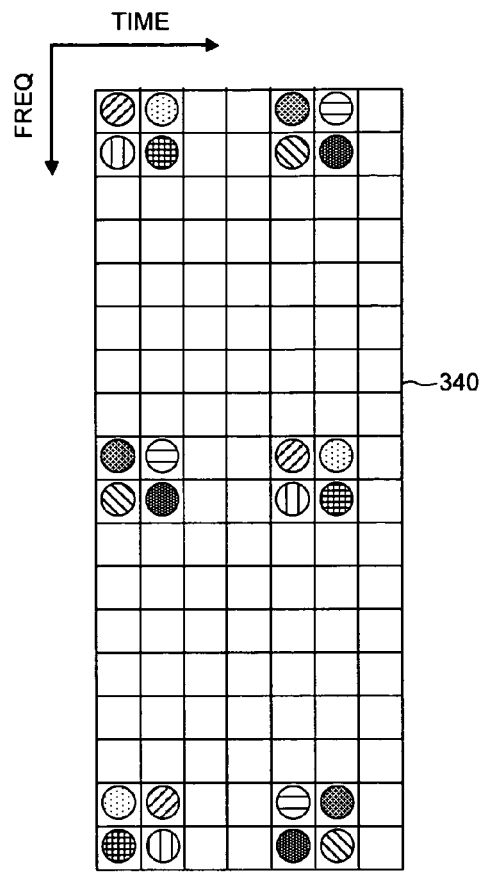

The above illustrated novel pilot pattern design can be easily extended to resource blocks with different sizes. FIG. 17A illustrates an example of pilot pattern based on a 18×5 resource block 330, and FIG. 17B illustrates an example of pilot pattern based on a 18×7 resource block 340. In the example of FIG. 17A, the pilots are positioned under the same rule illustrated in step 305 of FIG. 14. In the example of FIG. 17B, the pilots are positioned exactly in the same location as in FIG. 16A, with the rightmost time slot carrying data only. This arrangement can minimize the changes of channel estimation coefficients, since the channel estimation coefficients of the 18×6 resource block can be used in the first six symbols of a 18×7 resource block when two resource blocks are co-exist in a system.

Figure 18:
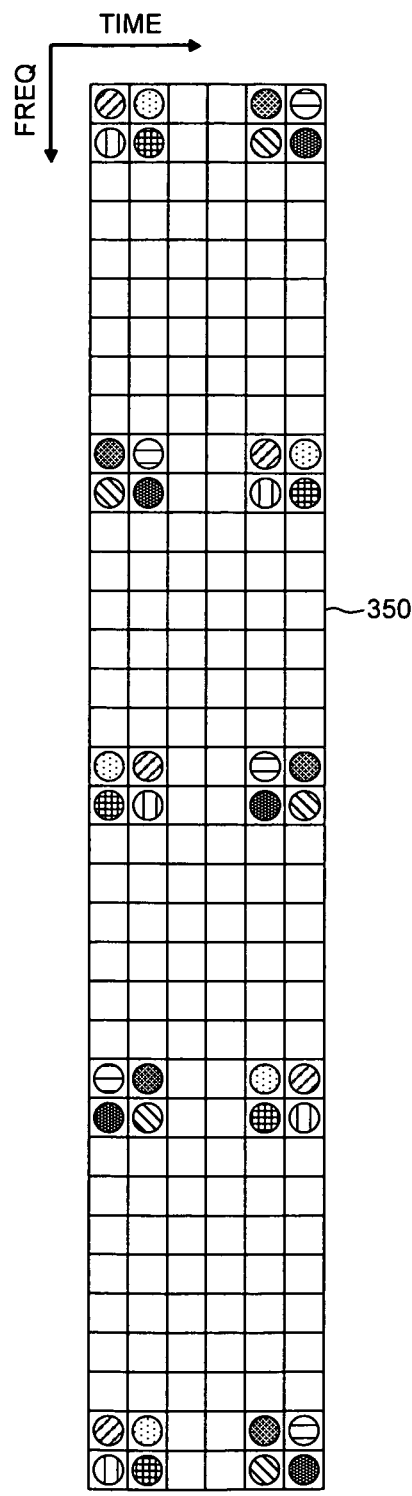
FIG. 18 illustrates an example of pilot pattern design based on a 36×6 resource block in an eight-stream MIMO system.

FIG. 18 illustrates an example of pilot pattern design based on a 36×6 resource block 350 in an eight-stream MIMO OFDMA System 3C. The number of pilots to be allocated per data stream is five. As illustrated in FIG. 18, for each data stream, two pilots are positioned at the top edge and the bottom edge of resource block 350 along the frequency domain. The remaining three pilots are equally spaced in between the allocated two pilots along the frequency domain. As illustrated in FIG. 18, pilots are positioned as far as possible along the time domain to reduce channel extrapolation. In addition, it is further verified that with respect to each data stream, each time slot has no more than one pilot allocated such that power fluctuation is minimized.

Figure 19:
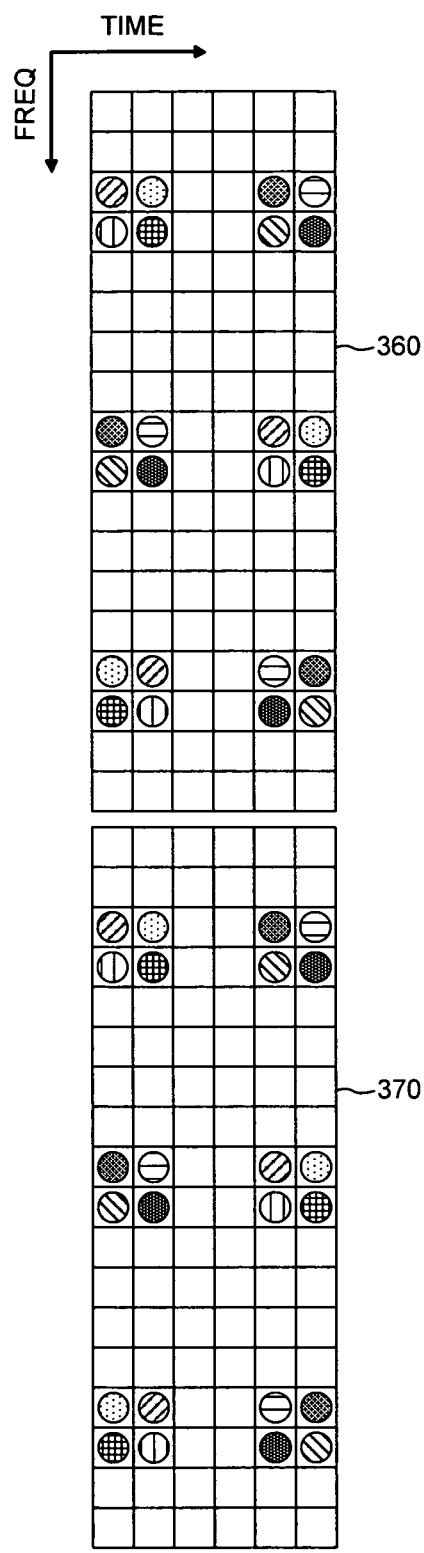
FIG. 19 illustrates an example of pilot pattern design using continuous resource blocks in an eight-stream MIMO system.

FIG. 19 illustrates two continuous 18×6 resource blocks 360 and 370 in an eight-stream MIMO OFDMA System 3B. The number of pilots to be allocated per resource block and per data stream is three. In some MIMO OFDMA system environments, continuous resource blocks can be jointly used for channel estimation. As illustrated in FIG. 19, two entire row of frequency tones near top edge and two entire row of frequency tones near bottom edge of resource blocks 360 and 370 are left blank. As a result, the bottom pilots of resource block 360 and the top pilots of resource block 370 are not too close to each other. This would provide better channel estimation quality when resource blocks 360 and 370 are jointly used. FIG. 19 also can be extended for 36×5 and 36×7 resource blocks. For a 36×5 resource block, its corresponding pilot pattern is obtained by removing the third or fourth pilot-free symbol of FIG. 19. For a 36×7 resource block, its corresponding pilot pattern is obtained by adding a pilot-free symbol right after the six symbols of FIG. 19.

Figure 20A:
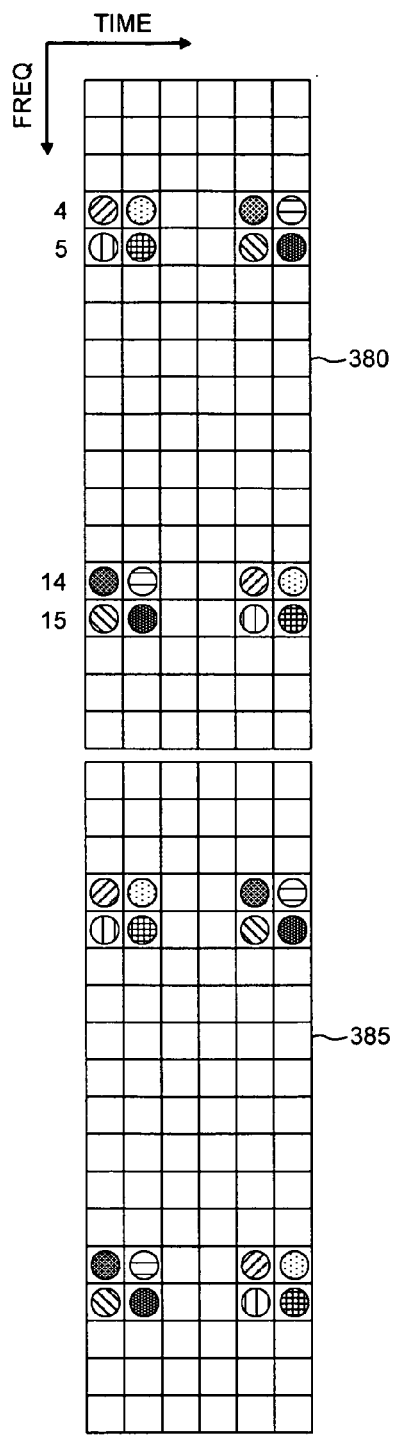
FIGS. 20A and 20B illustrate examples of pilot pattern design using continuous resource blocks in an eight-stream MIMO system.
Figure 20B:
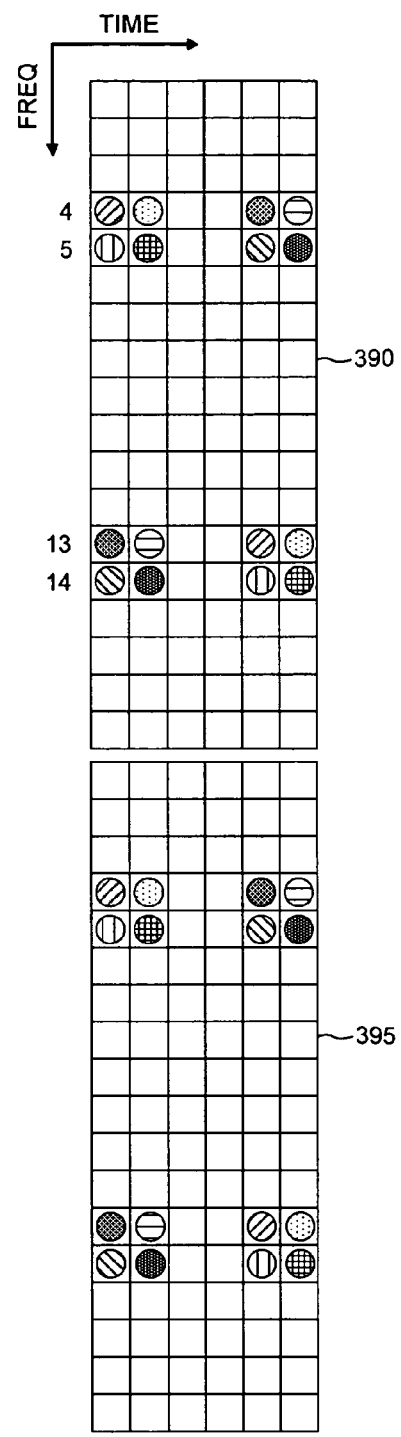

FIGS. 20A and 20B illustrate some other examples of jointly using continuous resource blocks for channel estimation in an eight-stream MIMO OFDMA system. In these exemplary embodiments, the number of pilots for each stream is further reduced to be two, since the pilots of adjacent resource blocks have advantage on the data-tone channel estimation in boundaries of each resource block. In the example of FIG. 20A, an 18×6 resource block 380 and an 18×6 resource block 385 are adjacent to each other. Three entire rows of frequency tones near tope edge and three entire rows of frequency tones near bottom edge of resource blocks 380 and 385 are left blank. In other words, one pilot of each data stream is located in the $4^{th}$ or the $5^{th}$ frequency tone, and the other pilot of each data stream is located in the $14^{th}$ or the $15^{th}$ frequency tone. As a result, the bottom pilot in resource block 380 and the top pilots in resource block 385 maintain good distance to provide good channel estimation quality. Similarly, as illustrated in FIG. 20B, an 18×6 resource block 390 and an 18×6 resource block 395 are adjacent to each other. Three entire rows of frequency tones near tope edge and four entire rows of frequency tones near bottom edge of resource blocks 390 and 395 are left blank. In other words, one pilot of each data stream is located in the 4$^{th}$ or the 5$^{th}$ frequency tone, and the other pilot of each data stream is located in the 13$^{th}$ or the 14$^{th}$ frequency tone. As a result, all the pilots of both resource blocks 390 and 395 are equally spaced along the frequency domain to provide better channel estimation quality. In addition, it should be noted that the pilot spacing of the overall pilots across the continuous resource blocks, illustrated in FIGS. 20A and 20B, satisfies the pilot spacing constraint derived from the 2D sampling theory. FIGS. 20A and 20B also can be extended for 18×5 and 18×7 resource blocks. For a 18×5 resource block, the pilot pattern is obtained by removing the third or fourth pilot-free symbol of the pilot pattern for the 18×6 resource block. For a 18×7 resource block, the pilot pattern is obtained by adding a pilot-free symbol right after the six symbol of the pilot pattern for the 18×6 resource block.

It is noted that the indices of the data streams are in a logical sense. They can be interchanged without affecting the pilot patterns. Moreover, the pilot patterns of an eight-stream MIMO system illustrated in the above examples can be directly extended to five-, six-, and seven-stream MIMO systems. For a five-stream MIMO system, the pilot positions for the sixth, seventh and eighth streams are used for allocating data rather than pilots. Similarly, for six-stream MIMO system, the pilot positions for the seventh and eighth streams are used for allocating data; and for a seven-stream MIMO system, the pilot positions for the eighth stream are used for allocating data.

In multi-antenna MIMO OFDMA systems, the transmitter transmits data through multiple transmitting antennas and the receiver receives data through multiple receiving antennas. Because each receiving antenna receives data from all the transmitting antennas, the number of channels that the signal will propagate over is the combinations of number of transmitting antennas and number of receiving antennas. For example, if there are P transmitting antennas and Q receiving antennas, then the signal will propagate over PxQ channels, each of which has its own channel response. Therefore, in MIMO OFDMA systems, a good channel estimation method is particularly crucial because of the limitation of the computational power for estimating PxQ channels. The novel pilot pattern designs described above would be significantly beneficial for MIMO OFDMA systems by maximally minimizing extrapolation and providing simple and fast channel estimation.

In MIMO systems, each transmitting antenna inserts pilot symbols into the same sub-carrier and time slot of the OFDM symbol, which it is transmitting. This introduces interference at the receiver between the pilot symbols of each transmitting antenna. In order to minimize interference between the pilot symbols of each transmitting antenna, pilot symbols are maintained orthogonal to each other among transmitting antennas. In addition, for each antenna, if pilot symbols are inserted in a specific time slot and a specific frequency tone, then other antennas put null symbols in the same location in time and frequency domain. As a result, a pilot transmitted by one antenna would not be interfered by other signals transmitted by other antennas.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   a) defining a resource block by a wireless communication device in an Orthogonal Frequency Division Multiple Access (OFDMA) communications system, wherein the resource block is a two-dimensional block having an array of frequency tones along frequency domain and an array of time slots along time domain;
   b) determining a specified number of pilots to be allocated within the resource block by the device based on a set of communications system requirements;
   c) determining whether two or more adjacent resource blocks are used for channel estimation; and
   d) positioning two pilots by the device near two edges of the resource block in the frequency domain with zero or more spaces from the frequency edges to avoid channel extrapolation based on the determining in c), and positioning remaining pilots of the specified number of pilots to be substantially equally spaced in between the allocated two pilots along the frequency domain; and
   e) reserving one or more frequency tones at two edges of the resource block in the frequency domain such that edge pilots of adjacent resource blocks are substantially equally spaced with each other and with other pilots along the frequency domain to improve channel estimation if two or more adjacent resource blocks are available to be used for channel estimation.

2. The method of claim 1, wherein the set of communications system requirements is specified by at least one of maximum Doppler spread, maximum delay spread, peak data rate, and throughput.

3. The method of claim 2, wherein the determining in b) involves calculating pilot spacing constraints based on two-dimensional sampling theory.

4. The method of claim 1, wherein the positioning in d) also involves allocating an approximately equal number of pilot tones along the time domain to minimize power fluctuation.

5. The method of claim 1, wherein the OFDMA communications system is a high-rank multi-input multi-output (MIMO) system with at least four streams, wherein the positioning in d) is repeated with respect to each stream.

6. The method of claim 5, wherein an approximately equal number of pilot tones are evenly distributed in each time slot with respect to each stream to minimize transmit power fluctuation.

7. The method of claim 1, further comprising:
   e) reserving one or more frequency tones at one or more edges of the resource block to be pilot-free such that multiuser synchronization error effect is reduced.

8. The method of claim 1, wherein a selected frequency tone and a selected time slot are adapted for transmitting a pilot tone of the specified number of the plurality of pilot tones for one antenna data stream, and wherein no data symbol is transmitted using the selected frequency tone and the selected time slot for another antenna data stream.

9. A wireless communications device, comprising:
   a transmitter that transmits a plurality of pilot tones for a data stream using a two-dimensional resource block having an array of frequency tones along frequency domain and an array of time slots along time domain; and
   a pilot allocation module that allocates a specified number of the plurality of pilot tones, wherein the specified number is determined based on a set of communications system requirements, wherein two pilots are allocated near two edges of the resource block in the frequency domain with zero or more spaces from the frequency edges base on whether two or more adjacent resource blocks are used for channel estimation, and wherein remaining pilots of the specified number of pilots are substantially equally spaced in between the allocated two pilots along the frequency domain, and wherein one or more frequency tones at two edges of the resource block are reserved such that edge pilots of adjacent resource blocks are substantially equally spaced with each other and with other pilots along the frequency domain to improve channel estimation if two or more adjacent resource blocks are available to be used for channel estimation.

10. The wireless communications device of claim 9, wherein the set of communications system requirements is specified by at least one of maximum Doppler spread, maximum delay spread, peak data rate, and throughput.

11. The wireless communications device of claim 9, wherein an approximately equal number of pilot tones are evenly distributed along the time domain to minimize power fluctuation.

12. The wireless communications device of claim 9, wherein at least four streams are transmitted in a high-rank multi-input multi-output (MIMO) system using the same resource block.

13. The wireless communications device of claim 12, wherein an approximately equal number of pilot tones are evenly distributed in each time slot with respect to each stream to minimize transmit power fluctuation.

14. The wireless communications device of claim 9, wherein one or more frequency tones at one or more edges of the resource block are reserved to be pilot-free such that multiuser synchronization error effect is reduced.

15. The wireless communications device of claim 9, further comprising:
   multiple antennas used in a Multi-Input Multi-Output (MIMO) system, wherein one pilot tone is transmitted by one antenna using a selected frequency tone and a selected time slot, and wherein no data symbol is transmitted by other antennas using the selected frequency tone and the selected time slot.

* * * * *